(12) United States Patent
Weir et al.

(10) Patent No.: US 11,353,124 B2
(45) Date of Patent: Jun. 7, 2022

(54) VALVE ASSEMBLY FOR WELL SYSTEMS

(71) Applicant: National Oilwell Vareo, L.P., Houston, TX (US)

(72) Inventors: James W. Weir, Cypress, TX (US); Jonathan Lewis Buelow, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 103 days.

(21) Appl. No.: 16/310,208

(22) PCT Filed: Jun. 14, 2017

(86) PCT No.: PCT/US2017/037521
§ 371 (c)(1),
(2) Date: Dec. 14, 2018

(87) PCT Pub. No.: WO2017/218685
PCT Pub. Date: Dec. 21, 2017

(65) Prior Publication Data
US 2019/0264822 A1 Aug. 29, 2019

Related U.S. Application Data

(60) Provisional application No. 62/349,744, filed on Jun. 14, 2016.

(51) Int. Cl.
*F16K 11/07* (2006.01)
*E21B 33/035* (2006.01)
(Continued)

(52) U.S. Cl.
CPC .......... *F16K 11/07* (2013.01); *E21B 33/0355* (2013.01); *E21B 34/16* (2013.01);
(Continued)

(58) Field of Classification Search
CPC ........ F16K 11/07; F16K 3/267; F16K 31/122; F16K 31/1226; F16K 31/12;
(Continued)

(56) References Cited

U.S. PATENT DOCUMENTS 3,736,958 A * 6/1973 Rostad .................... F16K 11/07
137/625.6
3,921,660 A * 11/1975 Kowalski ............ E21B 33/0355
137/236.1
(Continued)

OTHER PUBLICATIONS

International Search Report and Written Opinion dated Nov. 3, 2017, for International Application No. PCT/US2017/037521.
(Continued)

*Primary Examiner* — Craig J Price
(74) *Attorney, Agent, or Firm* — Conley Rose, P.C.

(57) ABSTRACT

A valve for a well system including a valve housing including a first housing port, a second housing port, and a bore, a piston received in the bore and including a first end, a second end, and an annular flange including a first annular surface and a second annular surface both of which are in fluid communication with the second housing port, a piston seal disposed in the outer surface of the piston and in sealing engagement with an inner surface of the bore, and a cage assembly that includes a cage including a bore, a first cage
(Continued)

port, a second cage port, and a third cage port, and a spool disposed in the cage and coupled to the piston, the spool including a throughbore.

21 Claims, 18 Drawing Sheets

(51) Int. Cl.
*E21B 34/16* (2006.01)
*F16K 31/122* (2006.01)
*F16K 3/26* (2006.01)

(52) U.S. Cl.
CPC ............ *F16K 3/267* (2013.01); *F16K 31/122* (2013.01); *F16K 31/1226* (2013.01); *Y10T 137/86582* (2015.04)

(58) Field of Classification Search
CPC .... F16K 11/0716; F16K 3/265; F16K 31/163; F16K 31/363; F16K 3/24; F16K 3/246; F16K 31/383; F16K 47/023; F16K 11/044; E21B 33/0355; E21B 34/16; E21B 33/03; E21B 33/064; E21B 33/0353; Y10T 137/402; Y10T 137/5983; Y10T 137/6065; Y10T 137/86582; Y10T 137/86702; Y10T 137/8671; Y10T 137/8663; Y10T 137/86887; Y10T 137/86574; Y10T 137/8667; Y10T 137/86686
USPC ..... 251/28, 318, 1.3, 148, 25, 30.01, 62, 63; 137/596.18, 625.3, 625.4, 625.48, 625.6, 137/625.63, 625.66, 627, 5, 630; 166/285, 335, 344, 363, 379
See application file for complete search history.

(56) References Cited

U.S. PATENT DOCUMENTS

| | | | |
|---|---|---|---|
| 4,404,989 A * | 9/1983 | LeMoine | E21B 33/0355 137/236.1 |
| 4,540,022 A * | 9/1985 | Cove | E21B 34/02 137/625.3 |
| 4,887,643 A * | 12/1989 | Tomlin | E21B 33/0355 137/625.66 |
| 5,042,530 A | 8/1991 | Good et al. | |
| 5,398,761 A * | 3/1995 | Reynolds | E21B 33/0355 166/344 |
| 5,409,040 A | 4/1995 | Tomlin | |
| 5,771,931 A | 6/1998 | Watson | |
| 5,778,918 A | 7/1998 | McLelland | |
| 8,905,141 B2 * | 12/2014 | Gustafson | E21B 34/04 166/363 |
| 9,394,758 B2 * | 7/2016 | Landrith, II | E21B 34/04 |
| 9,422,783 B2 * | 8/2016 | Gustafson | E21B 33/064 |
| 10,337,638 B2 * | 7/2019 | Landrith, II | F16K 47/023 |
| 2013/0319557 A1 * | 12/2013 | Smith, III | F16K 1/42 137/625.66 |
| 2014/0061516 A1 | 3/2014 | Gustafson et al. | |
| 2014/0326459 A1 * | 11/2014 | Landrith, II | E21B 34/02 166/335 |
| 2016/0153578 A1 | 6/2016 | Landrith, II | |
| 2020/0096114 A1 * | 3/2020 | Stetzer | F16K 11/0712 |

OTHER PUBLICATIONS

Extended European Search Report dated Jan. 8, 2020, for Application No. 17814027.3.

* cited by examiner

VALVE ASSEMBLY FOR WELL SYSTEMS

CROSS-REFERENCE TO RELATED APPLICATIONS

This application is a 35 U.S.C. § 371 national stage application of PCT/US2017/037521 filed Jun. 14, 2017, entitled "Valve Assembly for Well Systems" which claims benefit of U.S. provisional patent application Ser. No. 62/349,744 filed Jun. 14, 2016, and entitled "Valve Assembly for Well Systems," both of which hereby incorporated herein by reference in their entirety.

STATEMENT REGARDING FEDERALLY SPONSORED RESEARCH OR DEVELOPMENT

Not applicable.

BACKGROUND

Drilling systems used for the recovery of hydrocarbons utilize drilling fluid or mud for drilling a wellbore in a subterranean earthen formation. In some applications, the drilling systems include a blowout preventer (BOP) stack attached to a subsea wellhead and configured to control the inlet and outlet of fluid from the wellbore, and particularly, to confine well fluids in the wellbore in response to a "kick" or rapid influx of formation fluid into the wellbore. An individual BOP stack may include both ram BOPs and annular BOPs. Annular BOPs are configured to close or seal against the outer surface of a drill string that is extending through the BOP stack.

Further, in some offshore well systems, a riser may be provided to fluidly connect the wellhead at the sea floor to a surface platform for passing fluid therebetween. Various devices, such the BOP stack, lower marine riser packages (LMRPs), manifolds, etc., may be located about the subsea wellhead to perform subsea operations. In some applications, one or more fluidically actuated valves, including sub-plate mounted (SPM) valves, are disposed about the wellhead and utilized for selectably actuating the various devices located adjacent the subsea wellhead, including individual BOPs of the BOP stack and components of the LMRP.

SUMMARY

An embodiment of a valve for a well system comprises a valve housing comprising a first housing port, a second housing port, and a bore, a piston received in the bore of the housing, the piston comprising a first end, a second end, a first piston seal disposed in the outer surface of the piston and in sealing engagement with an inner surface of the bore, and wherein the sealing engagement between the first piston seal and the inner surface of the bore forms a first chamber in the bore and a second chamber in the bore, a first piston port extending between the first chamber and the second chamber to provide fluid communication between the first chamber and the second chamber, wherein fluid pressurization of the first housing port displaces the piston in a first direction, and the fluid pressurization of the second housing port displaces the piston in a second direction opposite the first direction. In some embodiments, the piston comprises an annular flange comprising a first annular surface and a second annular surface, and the first piston port is disposed in the piston and extends between the first annular surface and the second annular surface of the annular flange. In some embodiments, the fluid pressurization of the first housing port applies a pressure force against the first end of the piston in the first direction, and the fluid pressurization of the second housing port applies a pressure force against the first annular surface of the annular flange in the first direction, and a pressure force against the second annular surface of the annular flange in the second direction. In some embodiments, the surface area of the first annular surface of the annular flange is less than the second annular surface of the annular flange. In certain embodiments, in response to displacement of the piston in the first direction, fluid is conveyed from the second chamber to the first chamber through the first piston port, and in response to displacement of the piston in the second direction, fluid is conveyed from the first chamber to the second chamber through the first piston port. In certain embodiments, the first piston port is configured to provide a flow restriction on fluid flowing between the first and second chambers when the piston is displaced in the first and second directions. In some embodiments, the flow restriction provided by the first piston port resists the displacement of the piston in the first and second directions. In some embodiments, the second housing port extends between an end of the valve housing and the first chamber. In certain embodiments, the valve further comprises a second piston seal configured to restrict fluid communication between the first housing port and the first and second chambers of the valve housing. In certain embodiments, the valve further comprises a cage comprising a bore, an first cage port, a second cage port, and a third cage port, and a spool disposed in the cage and coupled to the piston, the spool comprising a throughbore, wherein fluid pressurization of the first housing port displaces the piston and spool in a first direction, and the fluid pressurization of the second housing port displaces the piston and spool in a second direction. In some embodiments, the valve further comprises a first check valve disposed in the first piston port, the first check valve configured to permit fluid flow from the first chamber to the second chamber, and to restrict fluid flow from the second chamber to the first chamber. In some embodiments, the valve further comprises a second piston port extending between the first chamber and the second chamber, and a second check valve disposed in the second piston port and configured to permit fluid flow from the second chamber to the first chamber and to restrict fluid flow from the first chamber to the second chamber. In some embodiments, the second piston port is disposed in the piston. In some embodiments, the first piston port is configured to provide a first flow restriction and the second piston port is configured to provide a second flow restriction, where the first flow restriction is greater than the second flow restriction. In certain embodiments, the first piston port is configured to provide a first flow restriction and the second piston port is configured to provide a second flow restriction, where the first flow restriction is less than the second flow restriction.

An embodiment of a valve for a well system comprises a valve housing comprising a first housing port, a second housing port, and a bore, a piston received in the bore of the housing and having a longitudinal axis, the piston comprising a first end, a second end, and an annular flange comprising a first annular surface and a second annular surface, a piston seal disposed in the outer surface of the piston and in sealing engagement with an inner surface of the bore, the piston seal disposed in an axial position that is between the first annular surface and the second annular surface of the annular flange, and a cage assembly, comprising a cage comprising a bore, an first cage port, a second cage port, and a third cage port, a spool disposed in the cage and coupled to the piston, the spool comprising a throughbore, wherein the fluid pressurization of the first housing port applies a pressure force against the first end of the piston in a first direction, wherein the fluid pressurization of the second housing port applies a pressure force against the first annular surface of the annular flange in the first direction, and a pressure force against the second annular surface of the annular flange in a second direction opposite the first direction, wherein fluid pressurization of the first housing port displaces the piston and spool in the first direction, and the fluid pressurization of the second housing port displaces the piston and spool in the second direction. In some embodiments, the surface area of the first annular surface of the annular flange is less than the second annular surface of the annular flange. In some embodiments, the valve further comprises a piston port extending through the annular flange of the piston, wherein the sealing engagement between the first piston seal and the inner surface of the bore of the valve housing forms a first chamber in the bore and a second chamber in the bore, and wherein the piston port provides for fluid communication between the first chamber and the second chamber. In some embodiments, in response to displacement of the piston in the first direction, fluid is conveyed from the second chamber to the first chamber through the piston port, and in response to displacement of the piston in the second direction, fluid is conveyed from the first chamber to the second chamber through the piston port. In certain embodiments, the bore of the cage is defined by an inner surface comprising an expanded diameter section and a reduced diameter section, the spool comprises an outer surface comprising an expanded diameter section and a reduced diameter section, the diameter of the expanded diameter section of the spool is substantially equal to the diameter of the expanded diameter section of the cage, and the diameter of the reduced diameter section of the spool is substantially equal to the diameter of the reduced diameter section of the cage. In certain embodiments, the valve further comprises a cage seal disposed between the inner surface of the cage and the outer surface of the spool, the cage seal configured to restrict fluid communication between the first cage port and the second cage port. In certain embodiments, the spool and cage are configured to allow the spool to move within the cage between a first position, a second position, and a third position, wherein when the spool is disposed in the first position, fluid communication is provided between the second cage port and the third cage port, and fluid communication is restricted between the first cage port and the third cage port, when the spool is disposed in the second position, fluid communication is provided between the first cage port and the third cage port, and fluid communication is restricted between the second cage port and the third cage port, and when the spool is disposed in the third position, the spool is disposed between the first and second positions and fluid communication is restricted between the first cage port and the third cage port, and between the second cage port and the third cage port. In some embodiments, when the spool is disposed at positions between the first and third positions within the cage fluid communication is restricted between the first cage port and the third cage port, and when the spool is disposed at positions between the second and third positions within the cage fluid communication is restricted between the second cage port and the third cage port. In some embodiments, when the spool is displaced from the first position to the third position, a flow area between the second cage port and the third cage port becomes gradually reduced, and when the spool is displaced from the third position to the second position, a flow area between the first cage port and the third cage port becomes gradually increased. In certain embodiments, when the spool is displaced from the third position to the first position, a flow area between the second cage port and the third cage port becomes gradually increased, and when the spool is displaced from the second position to the third position, a flow area between the first cage port and the third cage port becomes gradually reduced.

An embodiment of a valve for a well system comprises a valve housing comprising a first housing port and a bore, a piston received in the bore of the housing, a cage having a longitudinal axis and comprising a bore defined by an inner surface, a first cage port, a second cage port axially spaced from the first cage port, and a third cage port axially spaced from the first cage port and the second cage port, and a spool disposed in the cage and coupled to the piston, the spool comprising a throughbore defined by an inner surface, a connector disposed in the throughbore of the spool, and a rib extending between the inner surface of the spool and the connector, wherein the connector of the spool comprises a bore defined by an inner surface, and a slot extending between the inner surface and an outer surface of the connector, wherein the piston is insertable into the bore of the connector via the slot of the connector to releasably couple the piston to the spool, wherein the spool comprises a first position within the cage where fluid communication is provided between the second cage port and the third cage port, and fluid communication is restricted between the first cage port and the third cage port, and comprises a second position within the cage where fluid communication is provided between the first cage port and the third cage port, and fluid communication is restricted between the second cage port and the third cage port, wherein fluid pressurization of the first housing port displaces the piston in a first direction and displaces the spool between the first position and the second position. In some embodiments, an outer surface of the piston comprises a reduced diameter section extending between a pair of annular shoulders, and wherein engagement between the first and second ends of the connector and the annular shoulders of the piston releasably couple the piston to the spool when the piston is received within the bore of the connector. In some embodiments, the reduced diameter section of the piston has an axial length that is greater than the axial length of the connector. In certain embodiments, the difference in axial length between the reduced diameter section of the piston and the connector provides for a predetermined amount of relative axial movement between the piston and the spool when the reduced diameter section of the piston is received within the bore of the connector. In certain embodiments, each annular shoulder of the piston has an outer diameter that is greater than a diameter of the bore of the connector. In some embodiments, the valve further comprises a valve plate comprising an annular surface, wherein a first end of the spool sealingly engages the annular surface of the valve plate when the spool is disposed in the first position. In some embodiments, the valve further comprises a cage plate comprising an annular surface, wherein a second end of the spool sealingly engages the annular surface of the cage plate when the spool is disposed in the second position. In certain embodiments, the valve housing comprises a second housing port and wherein fluid pressurization of the second housing port displaces the piston in a second direction.

An embodiment of a valve for a well system comprises a valve housing comprising a first housing port and a bore, a piston received in the bore of the housing and comprising an outer surface, the outer surface comprising a reduced diameter section extending between a pair of an annular shoulders, a cage having a longitudinal axis and comprising a bore defined by an inner surface, a first cage port, a second cage port axially spaced from the first cage port, and a third cage port axially spaced from the first cage port and the second cage port, and a spool disposed in the cage and coupled to the piston, the spool comprising a throughbore defined by an inner surface, a connector disposed in the throughbore of the spool, and a rib extending between the inner surface of the spool and the connector, wherein the connector of the spool comprises a first end, a second end, and a bore extending between the first end and the second end and defined by an inner surface, wherein, when the piston is received within the bore of the connector, engagement between the first and second ends of the connector and the annular shoulders of the piston releasably couple the piston to the spool, wherein the spool comprises a first position within the cage where fluid communication is provided between the second cage port and the third cage port, and fluid communication is restricted between the first cage port and the third cage port, and a second position within the cage where fluid communication is provided between the first cage port and the third cage port, and fluid communication is restricted between the second cage port and the third cage port, wherein fluid pressurization of the first housing port displaces the piston in a first direction and actuates the spool between the first position and the second position. In some embodiments, the bore of the connector has a diameter greater than a diameter of the reduced diameter section of the piston. In some embodiments, the difference in diameter between the bore of the connector and the reduced diameter section of the piston is configured to provide for a predetermined degree of angular misalignment between the piston and the spool when the reduced diameter section of the piston is received within the bore of the connector. In certain embodiments, the reduced diameter section of the piston has an axial length that is greater than the axial length of the connector. In certain embodiments, the difference in axial length between the reduced diameter section of the piston and the connector provides for a predetermined amount of relative axial movement between the piston and the spool when the reduced diameter section of the piston is received within the bore of the connector. In some embodiments, the connector of the spool comprises a slot extending between the inner surface of the connector and an outer surface of the connector, and wherein the piston is insertable into the bore of the connector via the slot to releasably couple the piston to the spool. In some embodiments, the valve further comprises a valve plate comprising an annular surface, wherein a first end of the spool sealingly engages the annular surface of the valve plate when the spool is disposed in the first position. In certain embodiments, the valve further comprises a cage plate comprising an annular surface, wherein a second end of the spool sealingly engages the annular surface of the cage plate when the spool is disposed in the second position. In certain embodiments, the valve housing comprises a second housing port and wherein fluid pressurization of the second housing port displaces the piston in a second direction.

An embodiment of a method for assembling a valve for a well system comprises disposing a longitudinal axis of a piston of the valve in a radially offset position relative a longitudinal axis of a spool of the valve, axially displacing the piston into a throughbore of the spool while the longitudinal axis of the piston is radially offset from the longitudinal axis of the spool, and radially displacing the piston relative the spool until the piston is received within the bore of a connector coupled to the spool to releasably couple the piston to the spool. In some embodiments, the method further comprises radially displacing the piston relative the spool until a reduced diameter section of an outer surface of the spool is received within the bore of the connector. In some embodiments, the method further comprises radially displacing the piston relative the spool until the longitudinal axis of the piston is aligned with the longitudinal axis of the spool. In certain embodiments, the method further comprises axially displacing the piston between a pair of radially extending ribs coupling the connector to the spool.

BRIEF DESCRIPTION OF THE DRAWINGS

For a detailed description of various exemplary embodiments, reference will now be made to the accompanying drawings in which.

DETAILED DESCRIPTION OF THE DISCLOSED EMBODIMENTS

Figure 1:
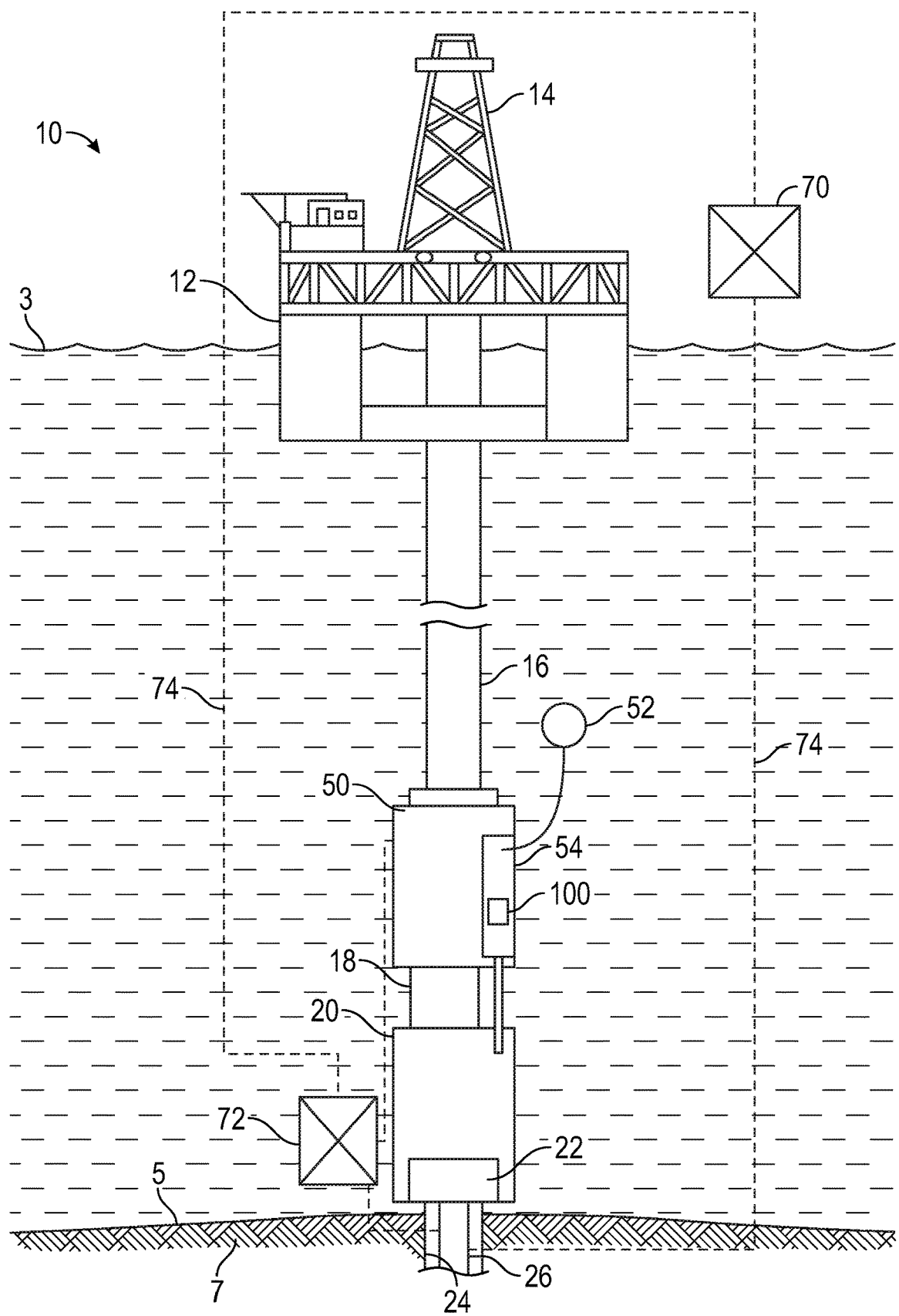
FIG. 1 is a schematic view of an offshore well system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct engagement of the two devices, or through an indirect connection via other intermediate devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

Referring now to FIG. 1, an embodiment of a well system 10 for drilling and/or producing a subsea well is shown. Well system 10 is shown in FIG. 1 as comprising a subsea or offshore well system; however, in other embodiments, well system 10 may comprise a land based well system or other types or configurations of offshore well systems. In the embodiment shown, well system 10 generally includes a platform 12 disposed at a water line or surface 3, a marine riser 16 extending from the platform 12 towards a sea floor 5, a LMRP 50, a mandrel 18, a BOP stack 20, a wellhead 22, and a wellbore 24 extending into an subterranean earthen formation 7. In this arrangement, marine riser 16 extends between LMRP 50 and platform 12, where platform 12 includes a rig or derrick 14. Mandrel 18 of well system 10 extends between and interconnects LMRP 50 with BOP stack 20, which is coupled to wellhead 22. As will be discussed further herein, LMRP 50 is in fluid communication with a subsea pressurized fluid source 52 (shown schematically in FIG. 1) for providing pressurized fluid for components of LMRP 50.

In the embodiment of FIG. 1, wellhead 22 of well system 10 provides a support base for BOP stack 20 and LMRP 18, as well as a fluid connection between marine riser 16 and the wellbore 24. Particularly, during drilling of wellbore 24, a drillstring or tubular member 26 extends from platform 12 through riser 16, LMRP 50, BOP stack 20, and into wellbore 24. Drillstring 26 includes a drill bit (not shown) secured to an end thereof for drilling formation 7. In this configuration, fluid is pumped from platform 12 through the drillstring 26 and into wellbore 24 via ports in the drill bit. The pumped fluid may then be recirculated to that platform 12 via an annulus disposed radially between drillstring 26 and an inner surface of components 16, 50, 20, and 22. BOP stack 20 comprises a plurality of BOPs configured to selectably isolate or restrict fluid communication from the wellbore 24 and the surrounding environment (i.e., the sea disposed above sea floor 5), such as in the instance of a "kick" or uncontrolled influx of fluids from the formation 7 into the wellbore 24.

In the embodiment shown, LMRP 50 includes a pod 54 (shown schematically in FIG. 1) in fluid communication with fluid source 52 and comprising a plurality of sealable valves 100 (shown schematically in FIG. 1). As will be discussed further herein, sealable valves 100 are configured to control the actuation of components of well system 10, including subsea components such as individual BOPs of BOP stack 20 and/or components of wellhead 22. In this embodiment, well system 10 also includes a surface controller 70 disposed above the water line 3 and a subsea controller 72 disposed proximal the sea floor 5. In certain embodiments, surface controller 70 is configured for operating, monitoring and/or controlling the platform 12, derrick 14, and/or other surface components of well system 10. Conversely, in certain embodiments, subsea controller 72 is configured for operating, monitoring and/or controlling LMRP 50, pod 54, wellhead 22, and/or other subsea components of well system 10. In some embodiments, surface controller 70 may be disposed on the platform 12 or in a remote location. Communication links 74 are provided for providing signal communication between controllers 70 and 72 and various components of well system 10 monitored and/or controlled by controllers 70 and 72.

Figure 2:
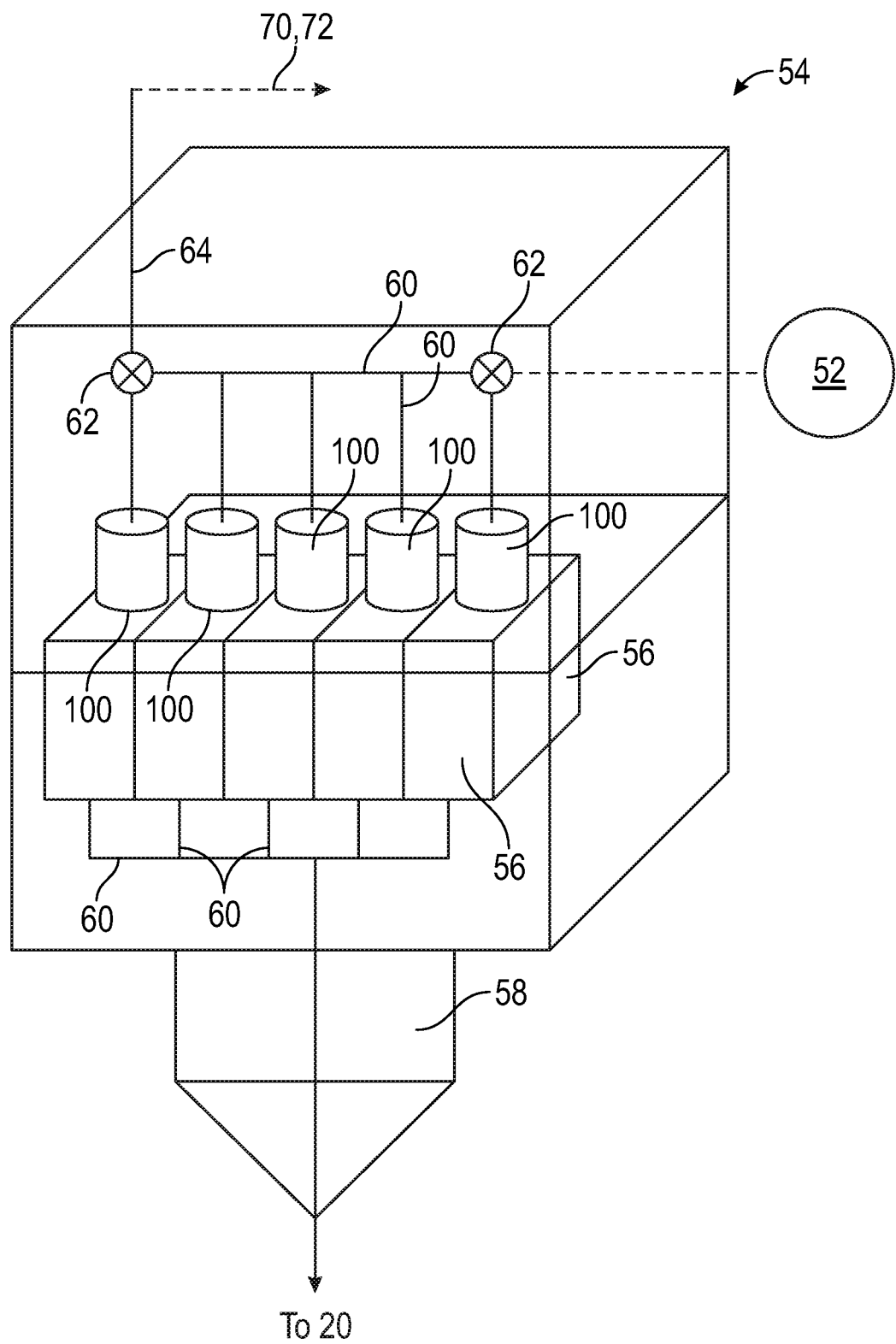
FIG. 2 is a schematic view of a portion of a lower marine riser package and a plurality of sealable valves of the well system of FIG. 1 in accordance with principles disclosed herein.

Referring to FIGS. 1 and 2, FIG. 2 schematically illustrates pod 54 of the LMRP 50 of well system 10. In the embodiment shown, pod 54 generally includes a plurality of sealable valves 100, a corresponding plurality of valve blocks 56, a stab or connector 58 providing a mechanical connection between pod 54 and other subsea components of well system 10, flowlines 60 for providing fluid communication to components of pod 54, and a plurality of pilot valves 62 in signal communication with a communication link 64. In this arrangement, valve blocks 56 mechanically secure valves 100 to pod 54, where each valve 100 is in fluid communication with a corresponding pilot valve 62. In the embodiment shown, each pilot valve 62 is configured to receive pressurized fluid from fluid source 52 via the fluid coupling provided by flowlines 60, and is controlled via electrical signals communicated to pilot valves 62 from controllers 70 and/or 72 via communication link 64 extending therebetween.

Each pilot valve 62 may be actuated between a closed position and an open position in response to an actuation signal communicated to the pilot valve 62 via controllers 70 and/or 72. In the open position, each pilot valve 62 communicates pressurized pilot fluid from fluid source 52 to a corresponding valve 100 in selectable fluid communication therewith. Conversely, in the closed position, each pilot valve 62 restricts fluid communication between the fluid source 52 and the corresponding sealable valve 100. In this manner, each pilot valve 62 is configured to fluidically actuate a corresponding sealable valve 100 in selectable fluid communication therewith in response to a signal communicated to each pilot valve 62 from controllers 70 and/or 72. Although sealable valves 100 are shown in FIG. 2 as forming a part of pod 54, in other embodiments, valves 100 may form a part of other components of well system 10.

Moreover, in still other embodiments, valves 100 may be utilized in well systems other than the embodiment of well system 10 shown in FIG. 1.

Figure 3:
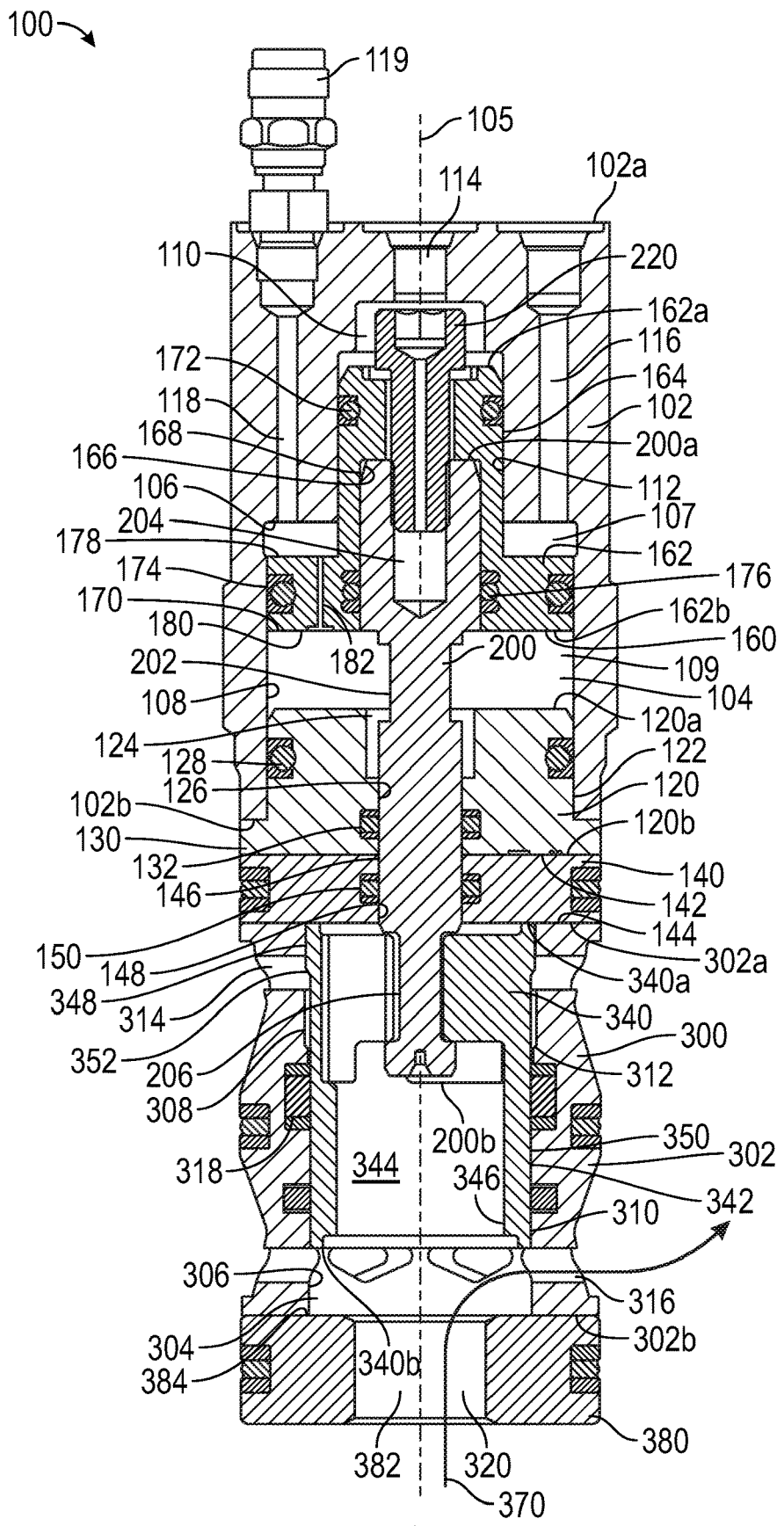
FIG. 3 is a side cross-sectional view of an embodiment of one of the sealable valves shown in FIG. 2 in accordance with principles disclosed herein.
Figure 4A:
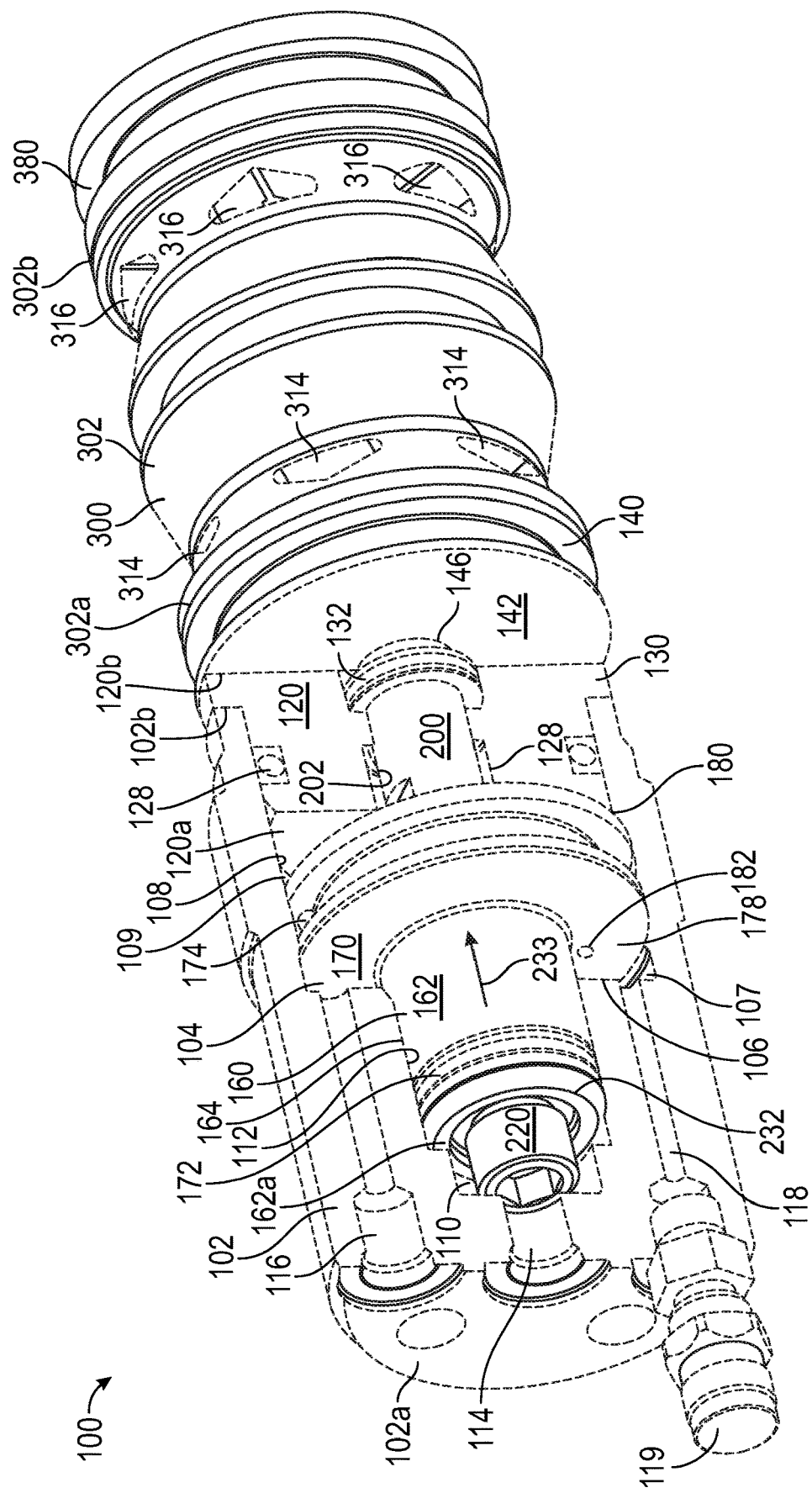
FIG. 4A is a first perspective, partial cross-sectional view of the sealable valve shown in FIG. 3.
Figure 4B:
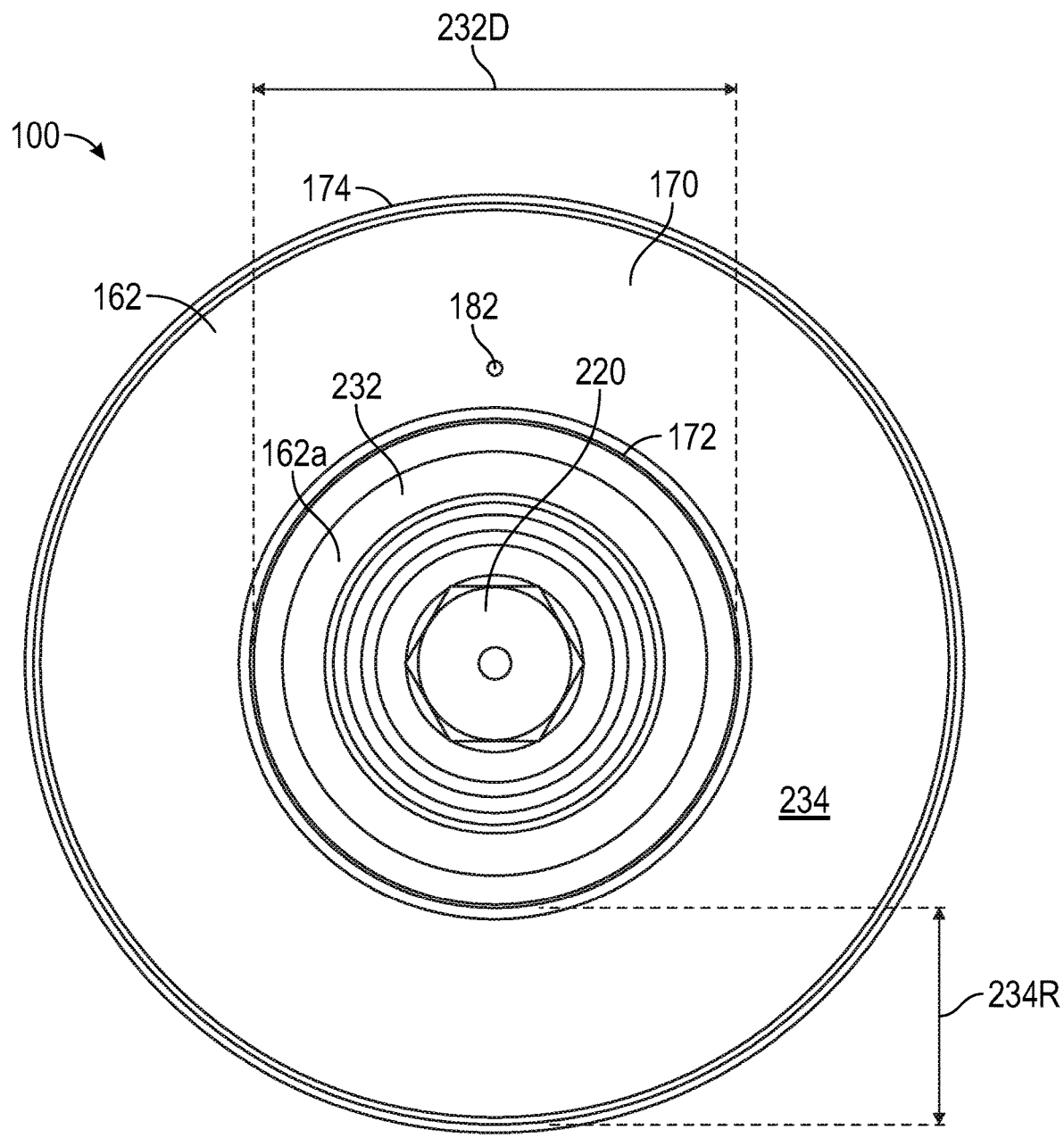
FIG. 4B is a top view illustrating a first pressure area and a second pressure area of the sealable valve shown in FIG. 3.

Referring to FIG. 3, an embodiment of one of the sealable valves 100 of FIGS. 1 and 2 is shown. In the embodiment shown, valve 100 has a central or longitudinal axis 105 and generally includes a housing 102, a hub 120, a valve plate 140, a piston or piston assembly 160, and a cartridge or cage assembly 300. Housing 102 has a first or upper end 102a, a second or lower end 102b, and a bore or chamber 104 extending axially into housing 102 from lower end 102b and terminating at an annular upper surface 106, where bore 104 is defined by a generally cylindrical inner surface 108 extending between lower end 102b and upper surface 106. A counterbore or piston receptacle 110 extends towards upper end 102a from the upper surface 106 of bore 104. Receptacle 110 is defined by a generally cylindrical inner surface 112 and is disposed coaxially with bore 104 and longitudinal axis 105 of valve 100.

Housing 102 of valve 100 also includes a first actuation port 114 extending axially (i.e., parallel with longitudinal axis 105) between upper end 102a and piston receptacle 110, a second actuation port 116 extending axially between upper end 102a and the upper surface 106 of bore 104, and a purge port 118 extending axially between upper end 102a and the upper surface 106 of bore 104. In this arrangement, first port 114 is axially aligned with longitudinal axis 105 while second port 116 and purge port 118 are each radially offset from longitudinal axis 105. First port 114 and second port 116 are each in fluid communication with a pair of pilot valves 62 shown in FIG. 2 for selectably providing pressurized fluid to first port 114 or second port 116. Purge port 118 includes a purge fitting 119 and is configured to provide a fluid conduit for purging bore 104 and second actuation port 116 of housing 102. Particularly, pressurized air or other gasses may be exhausted from bore 104 and second actuation port 116 through purge port 118 by pressurizing with hydraulic fluid second port 116.

In the embodiment shown in FIG. 3, hub 120 of valve 100 is disposed coaxially with longitudinal axis 105 and includes a first or upper end 120a, a second or lower end 120b, a generally cylindrical outer surface 122 extending between ends 120a and 120b, and a central throughbore 124 extending between ends 120a and 120b, where throughbore 124 is defined by a generally cylindrical inner surface 126. The outer surface 122 of hub 120 includes an annular seal 128 disposed therein for sealingly engaging the inner surface 108 of bore 104, and a radially outwards extending shoulder 130 for engaging the lower end 102b of housing 102. The inner surface 126 of throughbore 124 includes an annular seal 132 disposed therein for sealingly engaging a portion of piston assembly 160, as will be discussed further herein. In this arrangement, annular seals 128 and 132 of hub 120 act to seal bore 104 of housing 102 from the surrounding environment.

In the embodiment shown, valve plate 140 is disposed coaxially with longitudinal axis 105 and includes a first or upper annular surface 142, a second or lower annular surface 144, and a central throughbore 146 extending between surfaces 142 and 144 and defined by a generally cylindrical inner surface 148. The inner surface 148 of throughbore 146 includes an annular seal 150 disposed therein, where seal 150 is configured to sealingly engage a portion of piston assembly 160 to restrict fluid communication between throughbore 146 of valve plate 140 and the throughbore 124 of hub 120. As will be discussed further herein, the lower surface 144 of valve plate 140 comprises a sealing surface for sealing against a component of the cage assembly 300 of valve 100 for controlling fluid flow through cage assembly 300.

Still referring to FIG. 3, piston assembly 160 of valve 100 is configured to control the actuation of valve 100 between a first or closed position and a second or open position in response to the pressurization of ports 114 and 116 of housing 102 via pressurized fluid communicated from a corresponding pilot valve 62. In the embodiment shown, piston assembly 160 is disposed coaxially with longitudinal axis 105 and generally includes an annular piston 162, a piston rod 200, and a piston connector 220. Piston 162 has a first or upper end or surface 162a, a second or lower end or surface 162b, a generally cylindrical outer surface 164 extending between ends 162a and 162b, and a central throughbore 166 extending between ends 162a and 162b and defined by a generally cylindrical inner surface 168.

In the embodiment shown in FIG. 3, the outer surface 164 of piston 162 includes a radially outwards extending flange 170 proximal lower end 162b, a first or upper annular seal 172 disposed therein proximal upper end 162a, and a second or lower annular seal 174 disposed therein proximal lower end 162b. In this arrangement, upper seal 172 is configured to sealingly engage the inner surface 112 of the receptacle 110 of housing 102 while lower seal 174 is configured to sealingly engage the inner surface 108 of the bore 104 of housing 102. Inner surface 168 of throughbore 166 includes an annular seal 176 for sealingly engaging the piston rod 200 to restrict fluid communication between receptacle 110 and bore 104 of housing 102.

In the embodiment of FIG. 3, the annular flange 170 of piston 162 has a first or upper annular surface 178, a second or lower annular surface 180, and a port 182 extending axially between surfaces 178 and 180, where port 182 is radially offset from longitudinal axis 105. In this configuration, the sealing engagement provided by annular seals 172, 174, and 176 of piston 162 divide bore 104 of housing 102 into a first or upper chamber 107 and a second or lower chamber 109. The upper chamber 107 of bore 104 extends approximately between the upper surface 106 of bore 104 and the upper annular surface 178 of flange 170, while the lower chamber 109 of bore 104 extends approximately between the lower annular surface 180 of flange 170 and the upper end 120a of hub 120. In this manner, the only substantial fluid communication between chambers 107 and 109 is permitted via the port 182 extending axially through flange 170.

In the embodiment of FIG. 3, piston rod 200 has a first or upper end 200a, a second or lower end 200b, and a generally cylindrical outer surface 202 extending between ends 200a and 200b. The upper end 200a of piston rod 200 is received within the throughbore 166 of piston 162 and includes an aperture 204 extending into upper end 200a for receiving a lower end of connector 220. A portion of the outer surface 202 of piston rod 200 includes a reduced diameter section 206 proximal lower end 200b. As will be discussed further herein, cage assembly 300 of valve 100 is releasably coupled to piston rod 200 at the reduced diameter section 206 of the outer surface 202. In certain embodiments, a portion of the inner surface of aperture 204 is threaded for threadably connecting with a threaded outer surface of connector 220. Similarly, in certain embodiments, a portion of the throughbore 166 of piston 162 is threaded for threadably connecting the outer surface of connector 220, thereby threadably coupling connector 220 with both piston 162 and piston rod 200. While in the embodiment of FIG. 3 piston 162 is coupled to piston rod 200 via connector 220, in other embodiments, piston assembly 160 may comprise a single, unitary component.

Referring to FIGS. 3-6B, piston assembly 160 is displaceable within bore 104 of housing 102 in response to the pressurization of first port 114 or second port 116 of housing 102. Specifically, the fluid pressurization of first port 114 applies a pressure force against a first pressure surface area 232 disposed approximately at upper end 162a of piston 162, as shown particularly in FIGS. 4A and 4B, resulting in a first net pressure force 233 applied against piston assembly 160 in the axial direction of hub 120. As shown particularly in FIG. 4B, first pressure area 232 comprises a circular area comprising an upper surface of piston connector 220 and the upper end 162a of piston 162, where first pressure area 232 is defined by a diameter 232D corresponding substantially to the diameter of upper annular seal 172, which extends along the outer surface 164 of piston 162. The fluid pressurization of second port 116 applies a pressure force against a second pressure surface area 234 (shown in FIGS. 4B and 5) disposed at the upper surface 178 of annular flange 170. As shown particularly in FIG. 4B, second pressure surface area 234 comprises an annular surface area defined by an annular radius 234R extending between a radially inner end of upper surface 178 and lower annular seal 174, which extends along an outer radial end of upper surface 178.

As will be discussed further herein, pressurization of second port 116 also applies a pressure force against a third pressure surface area 236 (shown in FIGS. 6A and 6B), disposed at the lower surface 180 of flange 170. As shown particularly in FIG. 4B, third pressure surface area 236 includes lower annular surface 180 of annular flange 170 and an annular lower surface 167 of piston 162. In this arrangement, third pressure surface area 236 comprises an annular surface area defined by an annular radius 236R extending between a radially inner end of annular lower surface 167 and lower annular seal 174, which extends along an outer radial end of lower surface 180. In the embodiment shown, radius 234R of second pressure area 234 is less than the radius 236R of third pressure area 236, and thus, third pressure area 236 is greater than second pressure area 234. Given that third pressure area 236 is greater than second pressure area 234, the fluid pressurization of second port 116 results in a net pressure force 235 (shown in FIGS. 5 and 6) applied to piston assembly 160 in the axial direction of first port 114 of housing 102. As will be discussed further herein, fluid pressure applied to upper chamber 107 via the fluid pressurization of second port 116 is transmitted to lower chamber 109 via the port 182 in piston 162.

In the embodiment shown in FIGS. 3-10, cage assembly 300 of sealable valve 100 is configured to direct the flow of fluid to one or more subsea components of well system 10 for hydraulically actuating the component of well system 10. Although in FIGS. 3-10 cage assembly 300 is shown as forming a component of valve 100, in other embodiments, cage assembly 300 may be used in other sealable valves, including single-acting SPM valves that rely on a biasing mechanism (e.g., a coil spring, etc.) for controlling the actuation of the valve. In the embodiment shown, cage assembly 300 is disposed coaxially with longitudinal axis 105 of valve 100 and generally includes a cage 302, a spool 340, and a cage plate 380. Cage 302 is disposed axially between valve plate 140 and cage plate 380 and includes a first or upper end 302a, a second or lower end 302b, and a central throughbore 304 extending between ends 302a and 302b and defined by a generally cylindrical inner surface 306.

In the embodiment shown, the inner surface 306 of throughbore 304 includes a first or expanded diameter section 308 extending from upper end 302a and a second or reduced diameter section 310 extending from lower end 302b. In other embodiments, reduced diameter section 310 may extend from upper end 302a while expanded diameter section 308 extends from lower end 302b, with ports 314 serving as outlet ports and ports 316 serving as inlet ports. Sections 308 and 310 intersect at a radially extending annular shoulder 312. In this embodiment, expanded diameter section 308 has a greater diameter than the reduced diameter section 310. In this embodiment, cage 302 includes a plurality of circumferentially spaced second cage or radial inlet ports 314 that are positioned axially proximal upper end 302a, and a plurality of circumferentially spaced first cage or radial outlet ports 316 that are positioned axially proximal lower end 302b. Particularly, inlet ports 314 are extended radially from the expanded diameter section 308 of the inner surface 306 of cage 302. In other embodiments, ports 314 may comprise outlet ports while ports 316 comprise inlet ports. The reduced diameter section 310 of inner surface 306 of throughbore 304 further includes an annular seal 318 positioned axially between inlet ports 314 and outlet ports 316.

In the embodiment shown, spool 340 has a first or upper end 340a, a second or lower end 340b, a generally cylindrical outer surface 342 extending between ends 340a and 340b, and a central throughbore 344 extending between ends 340a and 340b and defined by a generally cylindrical inner surface 346. The outer surface 342 of spool 340 includes an expanded diameter section 348 extending from upper end 340a and a reduced diameter section 350 extending from lower end 340b, where diameter sections 348 and 350 intersect at a radially extending an annular shoulder 352. In this embodiment, the expanded diameter section 348 of outer surface 342 has a greater diameter than the reduced diameter section 350.

Referring still to FIGS. 3-10, the expanded diameter section 348 of the outer surface 342 of spool 340 is sized to physically engage or be disposed directly adjacent the expanded diameter section 308 of the inner surface 306 of cage 302, while the reduced diameter section 350 of outer surface 342 is configured to physically engage or be disposed directly adjacent the reduced diameter section 310 of inner surface 306. Specifically, in certain embodiments, the expanded diameter section 348 is substantially equal to the expanded diameter section 308 and reduced diameter section 350 is substantially equal to reduced diameter section 310. In other words, the diameters of expanded diameter sections 348 and 308 and reduced diameter sections 350 and 310 are manufactured to substantially the same diameter with only a nominal clearance extending between sections 350 and 310, where the nominal clearance is determined by the tolerances of the manufacturing process. In this arrangement, fluid flow between the expanded diameter section 348 of spool 340 and the expanded diameter section 308 of cage 302 is substantially restricted via the radial proximity of, or physical engagement between, sections 348 and 308. Similarly, fluid flow between the reduced diameter section 350 of spool 340 and the reduced diameter section 310 of cage 302 is substantially restricted via the proximity of, or physical engagement between, sections 350 and 310.

In the embodiment shown in FIGS. 3 and 7-10, spool 340 of cage assembly 300 includes a plurality of circumferentially spaced, radially extending ribs 354 and a generally cylindrical holder or connector 356 for releasably connecting spool 340 to the lower end 200b of piston rod 200.

Connector 356 is disposed coaxially with longitudinal axis 105 of valve 100 and includes a first or upper end 356a, a second or lower end 356b, a central throughbore 358 extending between ends 356a and 356b and defined by a generally cylindrical inner surface 360, and a slot 362 radially offset from longitudinal axis 105 and extending between ends 356a and 356b. Ribs 354 extend radially between the inner surface 346 of spool 340 and an outer cylindrical surface 359 of the connector 356 for positioning the connector 356 centrally within throughbore 344. In this embodiment, throughbore 358 has a diameter 358D (shown in FIG. 10). In the embodiment shown, cage plate 380 is disposed directly adjacent the lower end 302b of cage and includes a central throughbore 382 extending axially therethrough, where throughbore 382 comprises a work port 320 of valve 100. Cage plate 380 (shown in FIG. 3) also includes an upper annular surface 384 in engagement with the lower end 302b of cage 302. Spool 340 of the cage assembly 300 is configured to direct the flow of fluid between work port 320 of cage plate 380, which is in fluid communication with the lower end 340b of spool 340, and either inlet ports 314 or outlet ports 316.

Figure 11:
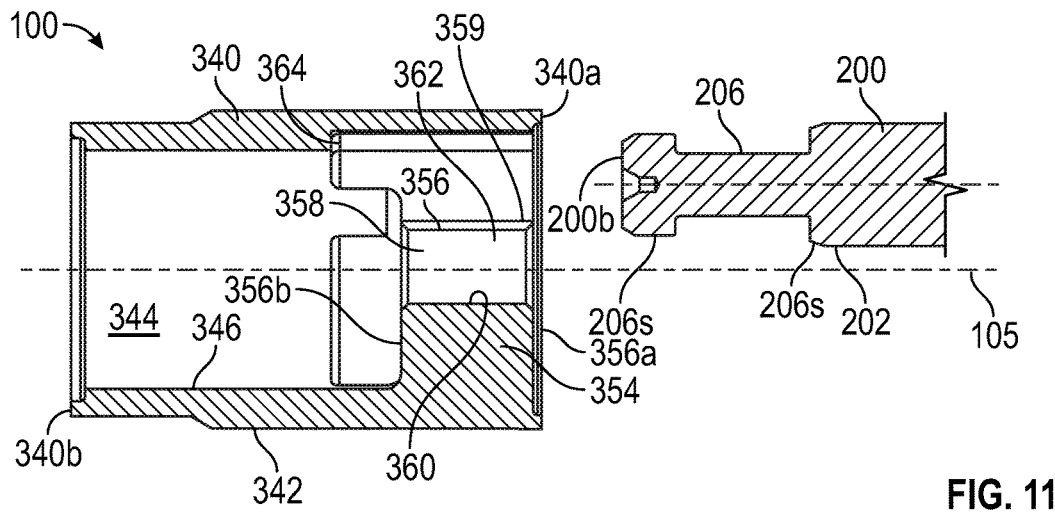
FIG. 11 is a first side cross-sectional view of the components of the cage assembly shown in FIG. 7.
Figure 12:
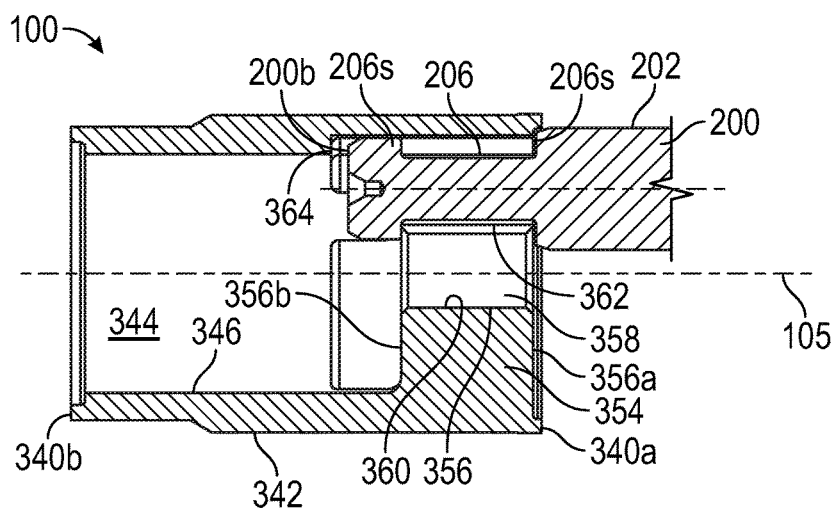
FIG. 12 is a second side cross-sectional view of the components of the cage assembly shown in FIG. 7.
Figure 13:
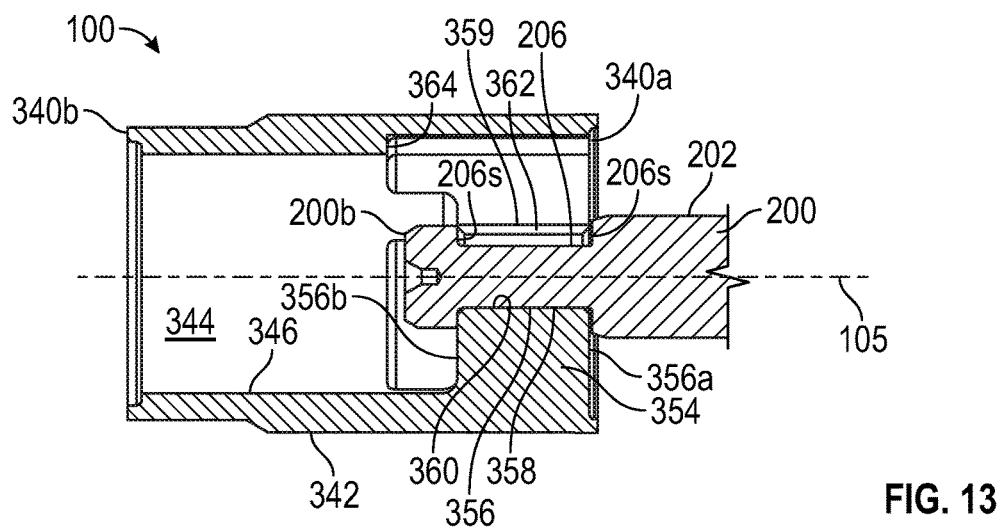
FIG. 13 is a third side cross-sectional view of the components of the cage assembly shown in FIG. 7.

FIGS. 11-13 illustrate an embodiment of a procedure for releasably coupling the piston rod 200 of piston assembly 160 to the spool 340 of cage assembly 300. In this procedure, prior to coupling, piston rod 200 is disposed in a position that is radially offset (as shown in FIG. 11) from the longitudinal axis of spool 340 (shown as coaxial with longitudinal axis 105 in FIGS. 11-13) such that a longitudinal axis of piston rod 200 extends between the pair of radially extending ribs 354 flanking the slot 362 of connector 356. Following the radially offset alignment of piston rod 200 respective spool 340, piston rod 200 may be axially inserted into the throughbore 344 of spool 340 until the lower end 200b of piston rod 200 is disposed proximal or physically engages an arcuate shoulder 364 formed on the inner surface 346 of spool 340.

In certain embodiments, arcuate shoulder 364 may be used to align the reduced diameter section 206 of piston 200 with the slot 360 of connector 356. Particularly, piston rod 200 is inserted axially into throughbore 344 until an upper end of reduced diameter section 206 of rod 200 is substantially axially aligned with the upper end 356a of connector 356 and a lower end of reduced diameter section 206 is substantially axially aligned with the lower end 356b of connector 356, as shown in FIG. 12. Once piston rod 200 has been axially aligned with spool 340, as shown in FIG. 12, piston rod 200 may be releasably coupled with spool 340 by radially displacing piston rod 200 into the throughbore 358 of connector 356 until the longitudinal axis of piston rod 200 is substantially aligned with the longitudinal axis 105 of spool 340, as shown in FIG. 13.

In this position, relative axial movement between piston rod 200 and spool 340 is restricted due to the interlocking engagement formed between the ends 356a and 356b of connector 356 and a pair of annular shoulders 206s disposed at each end of the reduced diameter section 206 of piston rod 200. Shoulders 206s define an axial length 206L (shown in FIG. 8) of reduced diameter section 206, which is greater in length than an axial length 356L (shown in FIG. 8) of connector 356. Particularly, the diameter 358D of the throughbore 358 of connector 356 is slightly larger than the diameter of the reduced diameter section 206 of piston rod 200, allowing for the reduced diameter section 206 to be received within throughbore 358. However, diameter 358D of throughbore 358 is less than an outer diameter 206O (shown in FIG. 8) of each shoulder 206s, forming an interlocking or interference connection between piston rod 200 and the connector 356.

In certain embodiments, the axial length of reduced diameter section 206 is slightly greater than the axial length of throughbore 358 of connector 356. In this arrangement, the slightly greater diameter of 358D of throughbore 358 (relative a diameter 206D of reduced diameter section 206) and the slightly shorter axial length 356L of connector 356 (relative the length of section 206) provide for limited axial and/or angular movement or "play" between piston rod 200 and spool 340. The "play" between piston rod 200 and spool 340 allows for a predetermined degree of angular misalignment between the longitudinal axis of spool 340 and the longitudinal axis of piston rod 200, as well as a predetermined degree of relative axial movement between spool 340 and piston rod 200. Specifically, when valve 100 is assembled as shown in FIG. 3, the longitudinal axis of piston rod 200 is disposed coaxially with longitudinal axis 105 of valve 100 while the longitudinal axis of spool 340 is permitted to enter into a slight angular misalignment with axis 105, such that the axis of spool 340 is disposed at an angle relative axis 105. The allowance of axial misalignment is configured to enhance sealing between the upper end 340a of spool 340 and the lower surface 144 of valve plate 140 when spool 340 is disposed in the position shown in FIG. 3. For instance, in certain embodiments, the lower surface 144 of valve plate 140 may not be perfectly planar and may include surface irregularities, allowing angular misalignment of spool 340 and the longitudinal axis 105 of valve 100 and valve plate 140 to enhance sealing between upper end 340a of spool 340 and the lower surface 144 of valve plate 140. Particularly, allowing and providing for angular misalignment between spool 340 and longitudinal axis 105 permits spool 340 to compensate or adjust to an offset or incongruity in lower surface 144, thereby enhancing the sealing engagement between spool 340 and valve plate 140. This arrangement similarly enhances sealing engagement between the lower end 340b of spool 340 and the upper annular surface 384 of cage plate 380.

Referring to FIGS. 3-6B and 14-16, the operation of sealable valve 100 is shown. Particularly, in this embodiment, sealable valve 100 includes a first or closed position shown in FIG. 3, a second or open position shown in FIG. 15, and a third or intermediate position shown in FIG. 14, where the intermediate position represents the halfway point between the closed and open positions, as will be discussed further herein. In this embodiment, valve 100 comprises a normally closed valve with inlet ports 314 and outlet ports 316; however, in other embodiments, valve 100 may comprise a normally open valve where ports 314 comprise outlet ports and ports 316 comprise inlet ports. In the closed position of valve 100 shown in FIG. 3, a first or outlet fluid flow path or flow area 370 extends between outlet ports 316 of cage 302 and the work port 320. In this position, pressurized fluid may be directed along outlet flow path 370 through valve 100 to exhaust a subsea component of well system 10 of pressurized fluid, such as a BOP of BOP stack 20. In addition, in the closed position, the upper end 340a of spool 340 sealingly engages the lower surface 144 of valve plate 140 while annular seal 318 of cage 302 sealingly engages the outer surface 342 of spool 340, thereby restricting fluid communication between inlet ports 314 of cage 302 and work port 320.

Valve 100 is placed or held in the closed position of FIG. 3 via controlling the fluid pressure within the actuation ports 114 and 116 of housing 102. Specifically, in the closed position, fluid within second port 116 is disposed at a greater pressure than fluid disposed in first port 114, resulting in net pressure force 235 (shown in FIGS. 5 and 6) being applied to piston assembly 160. The net pressure force 235 applied to piston assembly 160 retains the upper end 340a of spool 340 in sealing engagement with the lower surface 144 of valve plate 140 via the connection between piston rod 200 and spool 340. As discussed above, fluid pressure within ports 114 and 116 of the housing 102 of valve 100 may be manipulated via a corresponding pilot valve 62 in fluid communication with ports 114 and 116 of valve 100.

Figure 14:
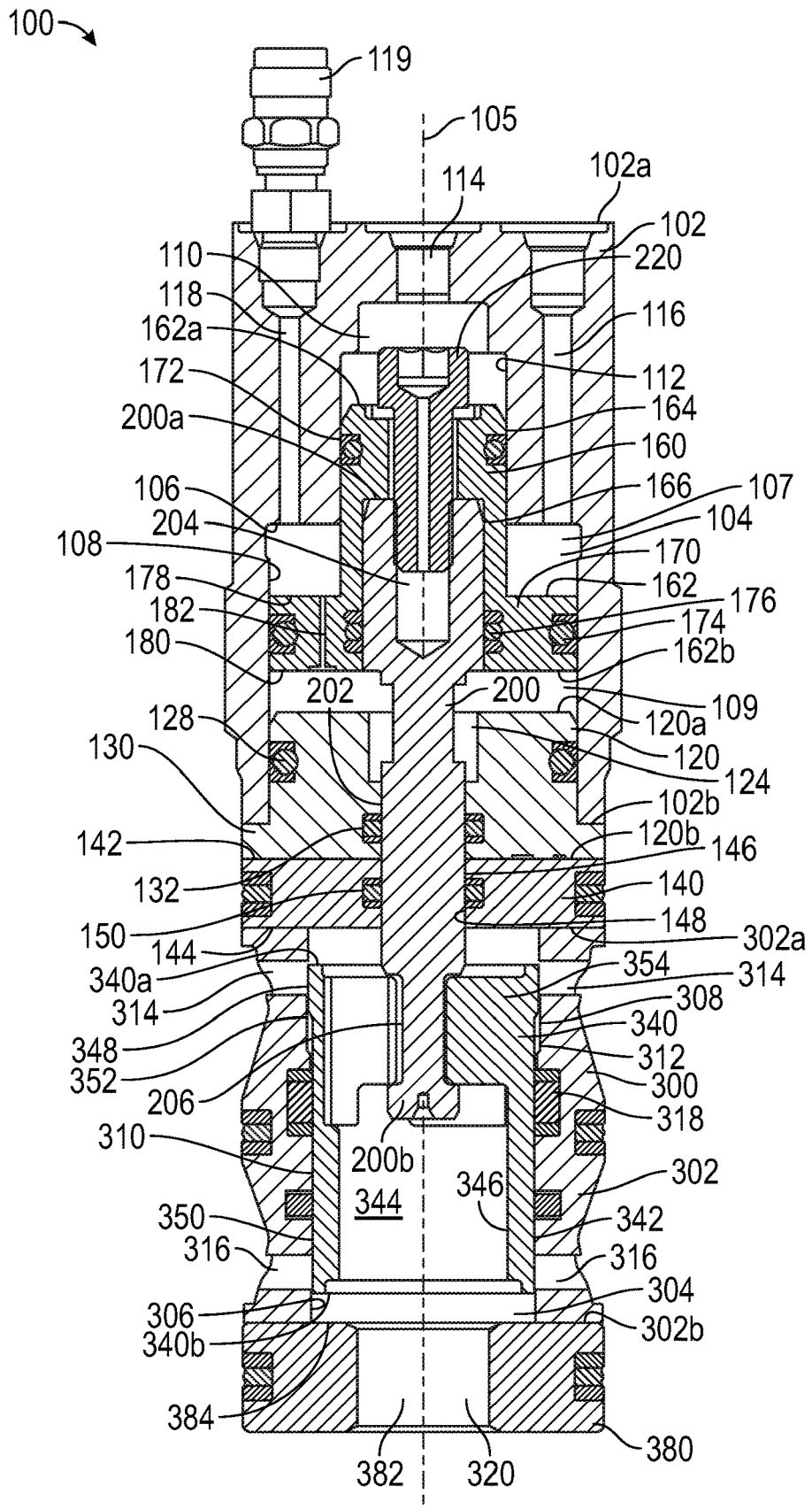
FIG. 14 is a cross-sectional view of the sealable valve shown in FIG. 3 with the components of the cage assembly of the sealable valve disposed in a second position.
Figure 15:
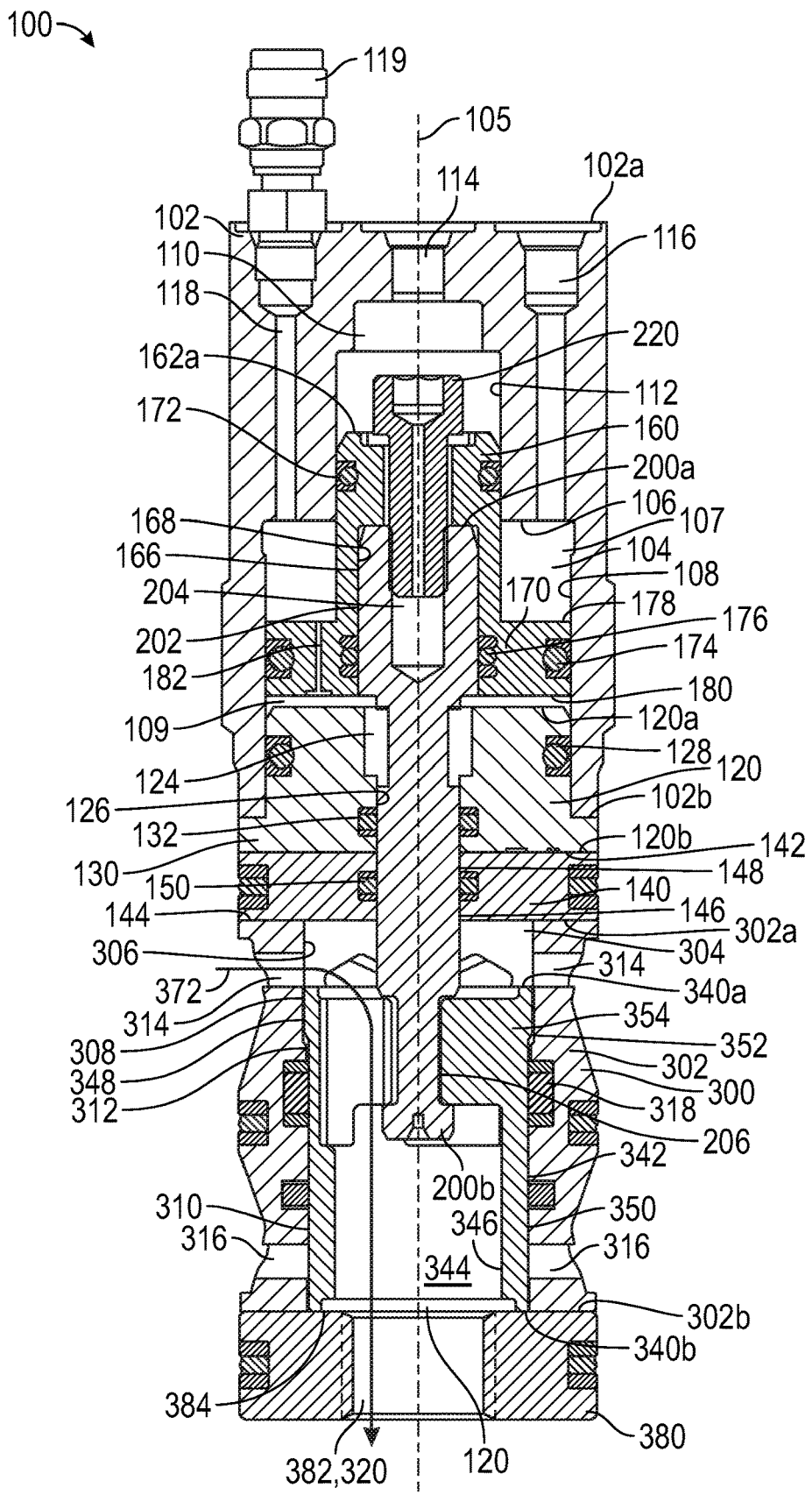
FIG. 15 is a cross-sectional view of the sealable valve shown in FIG. 3 with the components of the cage assembly of the sealable valve disposed in a third position.

With valve 100 disposed in the closed position shown in FIG. 3, valve 100 may be transitioned or actuated towards the intermediate position shown in FIG. 14 and the open position shown in FIG. 15 via increasing fluid pressure within first port 114 while concurrently decreasing fluid pressure within second port 116 such that fluid within first port 114 is disposed at greater pressure than the fluid disposed in second port 116, thereby applying net pressure force 233 against piston assembly 160. For instance, first port 114 may receive pilot fluid pressure from pilot valve 62 while second port 116 is vented. Net pressure force 233 causes piston assembly 160, in conjunction with spool 340, to begin travelling axially in the direction of cage plate 380 respective housing 102 and cage 302.

As piston 162 is displaced through bore 104 of housing 102 towards hub 120, fluid disposed in lower chamber 109 is forcibly conveyed through port 182 of piston 162 into upper chamber 107 as the volume of lower chamber 109 is reduced via the movement of piston 162 through bore 104. The fluid pressure within lower chamber 109 and the relatively small flow area provided by port 182 acts as a fluid damper that resists the displacement of piston 162 through bore 104 of housing 102. The damping effect provided by port 182 controls or modulates the displacement of piston 162, and in effect, controls the actuation of valve 100 between the closed, intermediate, and open positions. In this manner, fluid pressure within lower chamber 109 and the restrictive flow outlet provided by port 182 prevent, or at least mitigate, the possibility of potentially damaging "water-hammer" resulting from the actuation of valve 100 between the closed and open positions, as will be discussed further herein. In certain embodiments, the flow area of port 182 may be adjusted to control the actuation of valve 100 between the closed and open positions, where increasing the cross-sectional area of port 182 reduces the resistance applied to piston 162 and thereby increases the rate or speed of actuation of valve 100, and decreasing the area of port 182 increases the resistance on piston 162 and thereby decreases the rate of actuation of valve 100.

As valve 100 transitions from the closed position shown in FIG. 3 to the intermediate position shown in FIG. 14, the upper end 340a of spool 340 is displaced through throughbore 304 of cage 302 towards cage plate 380, thereby unseating the upper end 340a of spool 340 from the lower surface 144 of valve plate 140. Although sealing engagement is lost between the upper end 340a of spool 340 and lower surface 144 of valve plate 140 as spool 340 is displaced through throughbore 304, fluid communication between inlet ports 314 of cage 302 and work port 320 remains substantially restricted via the flow restriction provided by the very close proximity between the expanded diameter section 348 of spool 340 and the expanded diameter restriction 308 of cage 302. In certain embodiments, the expanded diameter section 348 of spool 340 sealingly engages the expanded diameter section 308 of cage 302, while in other embodiments, a small radial gap or clearance extends between sections 348 and 308.

Figure 16:
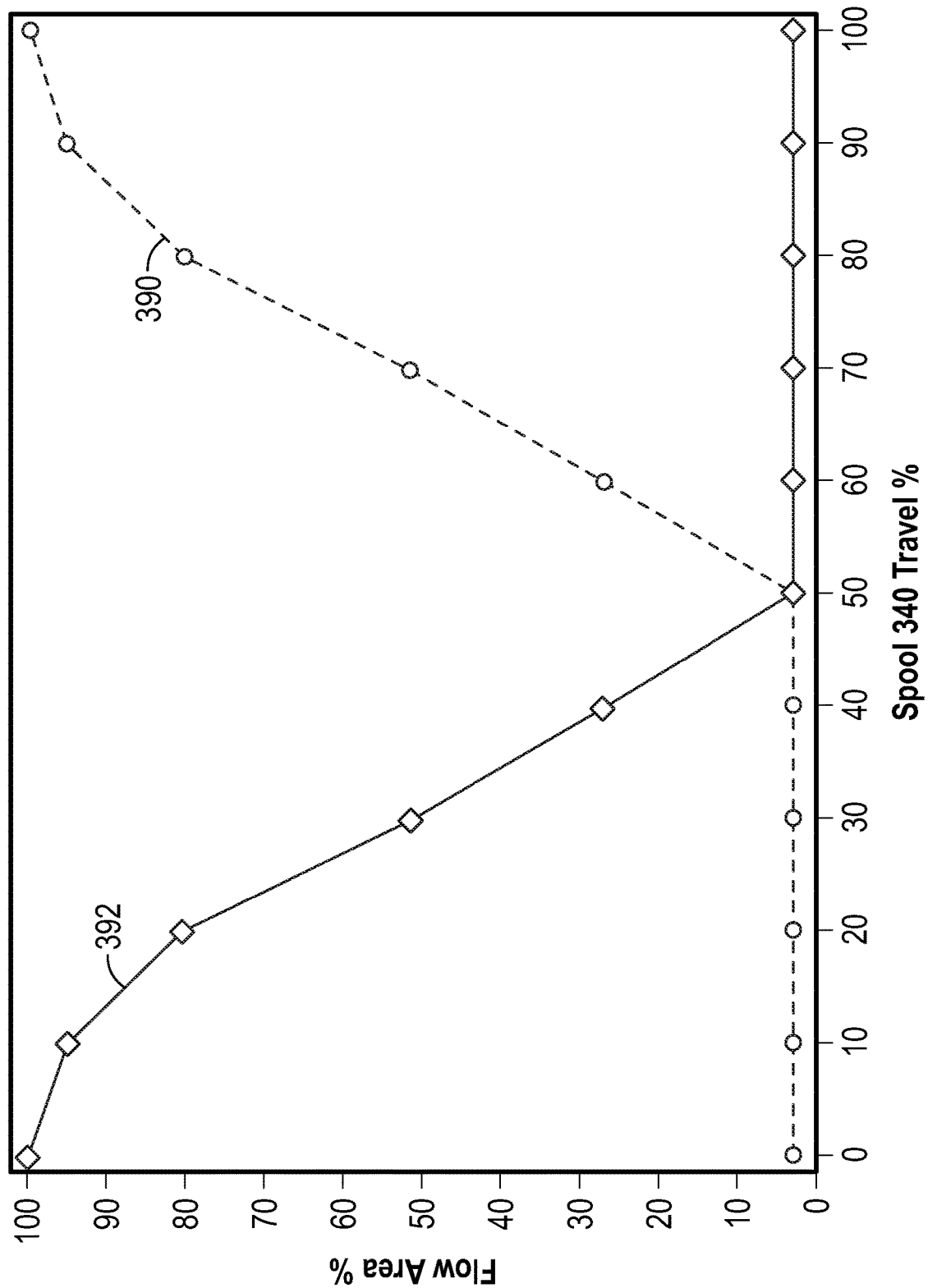
FIG. 16 is a graph schematically illustrating fluid flow areas through the sealable valve shown in FIG. 3 during actuation of the sealable valve in accordance with principles disclosed herein.

Shown particularly in FIG. 16, as valve 100 transitions from the closed position to the intermediate position, the flow area percentage 390 between inlet ports 314 and work port 320 remains near zero (between 0%-3% in an embodiment), where flow area percentage 390 represents the percentage of the potential flow area between inlet ports 314 and work port 320. The travel percentage of spool 340 indicated on the X-axis of the graph of FIG. 16 represents the amount of axial displacement of spool 340 through throughbore 304 of cage 302, with 0% travel percentage representing the position of spool 340 in FIG. 3, 50% travel percentage representing the position of spool 340 in FIG. 14, and 100% travel percentage representing the position of spool 340 in FIG. 15. The near zero flow area percentage 390 extending between the closed and intermediate positions of valve 100 suppresses or substantially eliminates fluid flow between inlet ports 314 and work port 320 as spool 340 travels between the open and intermediate positions, thereby controlling or modulating the flow of fluid through spool assembly 300. In this configuration, the action of port 182 of piston 162 and the flow restriction created between the expanded diameter sections 348, 308, and reduced diameter sections 350, 310, of spool 340 and cage 302, respectively, act in unison to control the actuation of valve 100 between the closed and open positions such that the actuation of valve 100 proceeds at a predetermined rate. However, in other embodiments, the piston assembly 160, including the ported piston 162, may be used with other cage assemblies that do not include flow restrictions configured to modulate fluid flow therethrough.

Conversely, as valve 100 transitions from the closed position to the intermediate position, the flow area percentage 392 (also shown in FIG. 16) between outlet ports 316 and work port 320 is gradually reduced via the lower end 340b of spool 340 gradually covering outlet ports 316, thereby gradually reducing the fluid flow between outlet ports 316 and work port 320. As shown particularly in FIG. 16, flow area percentage 392 represents the percentage of the potential flow area between outlet ports 316 and work port 320. Thus, as valve 100 transitions between the closed and intermediate positions, flow area percentage 390 remains closed (i.e., near 0% of potential flow area) while flow area percentage 392 gradually declines from open (i.e., near or at 100% of potential flow area) to closed as the lower end 340b of spool 340 covers outlet ports 316 and a flow restriction is created between the reduced diameter section 350 of spool 340 and the reduced diameter section 310 of cage 302, thereby substantially restricting or preventing fluid flow between outlet ports 316 and work port 320 as shown in FIG. 14. In certain embodiments, the reduced diameter section 350 of spool 340 sealingly engages the reduced diameter section 310 of cage 302, while in other embodiments, a small radial gap or clearance extends between sections 350 and 310.

As shown particularly in FIGS. 14-16, as valve 100 continues to transition from the closed position to the open position, valve 100 passes from the intermediate position shown in FIG. 14 to the open position shown in FIG. 15. Particularly, piston 162 continues its displacement through bore 104 of housing 102, with the travel of piston 162 being dampened or modulated via the flow resistance provided by fluid disposed in lower chamber 109 and the relatively small flow area of port 182. In addition, spool 340 continues its displacement through throughbore 304 of cage 302 in conjunction with the displacement of piston 162. Particularly, the flow restriction disposed between the reduced diameter section 350 of spool 340 and the reduced diameter section 310 of cage 302 maintains or holds the flow area percentage 392 between outlet ports 316 and work port 320 closed between the intermediate and open positions while the flow area percentage 390 between inlet ports 314 gradually increases from closed at the intermediate position to open at the open position of valve 100. In this manner, as valve 100 transitions from the intermediate position to the open position, the upper end 340a of spool 340 gradually uncovers inlet ports 314, thereby gradually increasing flow area percentage 390 and fluid communication between inlet ports 314 and work port 320. Further, in the open position of valve 100, the lower end 340b of spool 340 sealingly engages or is disposed directly adjacent the upper annular surface 384 of cage plate 380.

Once in the open position shown in FIG. 15, valve 100 may be transitioned or actuated into the closed position shown in FIG. 3 by pressurizing the fluid within second port 116 while concurrently depressurizing the fluid within first port 114 such that fluid disposed in second port 116 is at a higher pressure than fluid within first port 114. For instance, second port 116 may receive pilot fluid pressure from pilot valve 62 while first port 114 is vented. In this embodiment, as upper chamber 107 receives fluid pressure from second port 116, a pressure differential is created between upper chamber 107 and lower chamber 109, where the pressure within upper chamber 107 is greater than the pressure within lower chamber 109. As a result of the pressure differential between chambers 107 and 109, fluid from upper chamber 107 flows into lower chamber 109 via port 182 in annular flange 170. As fluid from upper chamber 107 enters lower chamber 109 via port 182, fluid pressure within lower chamber 109 increases until fluid disposed in lower chamber 109 reaches a threshold fluid pressure.

Once fluid pressure within lower chamber 109 reaches the threshold pressure, net pressure force 235 is applied to piston assembly 160, displacing piston assembly 160 through bore 104 of housing 102 towards the upper surface 106 of bore 104 and spool 340 towards the lower surface 144 of valve plate 140. Given that the third pressure area 236 (shown in FIG. 6B) is greater than the second pressure area 234 (shown in FIG. 4B), the threshold fluid pressure of lower chamber 109 to displace piston assembly 160 is less than the fluid pressure disposed in upper chamber 107. In other words, fluid pressure in chambers 107 and 109 does not need to be equalized to result in the application of net pressure force 235 against piston assembly 160. Instead, the pressure differential between chambers 107 and 109 need only be reduced in response to fluid flow from upper chamber 107 to lower chamber 109 via port 182 until pressure within lower chamber 109 reaches the threshold fluid pressure. Further, as piston assembly 160 is displaced through bore 104 of housing 102, the volume of lower chamber 109 is increased, thereby requiring fluid flow from upper chamber 107 to lower chamber 109 via port 182 to maintain pressure within lower chamber 109 substantially at the threshold fluid pressure until valve 100 is disposed in the closed position of FIG. 3, at which point fluid pressure is equalized between upper chamber 107 and lower chamber 109.

As valve 100 transitions from the open position to the closed position, fluid disposed in upper chamber 107 of housing 102 is forcibly conveyed or displaced through port 182 of piston 162 into lower chamber 109, thereby creating a damping effect on piston 162 as it is displaced through bore 104. The damping effect created by the controlled flow of fluid through port 182 controls or modulates the actuation of valve 100 from the open position to the closed position. In addition, as valve 100 transitions from the open position to the closed position, flow area percentage 390 gradually decreases from open when valve 100 is in the open position to closed once valve 100 has reached the intermediate position with spool 340 having traversed halfway through the throughbore 304 of cage 302. Further, flow area percentage 392 remains closed until valve 100 reaches the intermediate position, at which point flow area percentage 392 gradually increases or opens until it is fully open once valve 100 has reached the closed position shown in FIG. 3. The gradual change in the condition of flow area percentages 390 and 392, and the prevention of overlap between concurrently open flow areas 390 and 392, modulates the flow of fluid through cage assembly 300.

In operation, inlet ports 314, outlet ports 316, and work port 320 are each connected to a separate fluid conduit (not shown), where the fluid disposed in inlet ports 314 is generally at a higher pressure than fluid disposed in outlet ports 316. In this manner, fluid communication between inlet ports 314 and work port 320 (as shown in FIG. 15) when valve 100 is disposed in the open position (or at a position between the open and intermediate positions) provides fluid flow along inlet flow path 372, while fluid communication between outlet ports 316 and work port 320 when valve 100 is disposed in the closed position (or at a position between the closed and intermediate positions) provides fluid flow along a second or outlet flow path or flow area 370 shown in FIG. 3. Given the pressure differential present between inlet ports 314 and outlet ports 316, fluid communication between ports 314 and 316 as valve 100 transitions between the closed and open positions may create a fluid flow path extending directly between ports 314 and 316, resulting in fluid loss as fluid flow between ports 314, 316 and work port 320 is thereby reduced, inhibiting the performance of valve 100. In certain embodiments, cage assembly 300 is configured such that there is no overlap in open flow area between flow area percentages 390 and 392, as shown in FIG. 16. In other words, one of the flow area percentages 390 or 392 is always closed, or at least substantially closed, (i.e., near 0% of the potential flow area), independent of the travel percentage of spool 340 between the closed and open positions of valve 100. However, in other embodiments, an overlap of partially open flow area percentages 390 and 392 may be allowed depending on the application.

Figure 5:
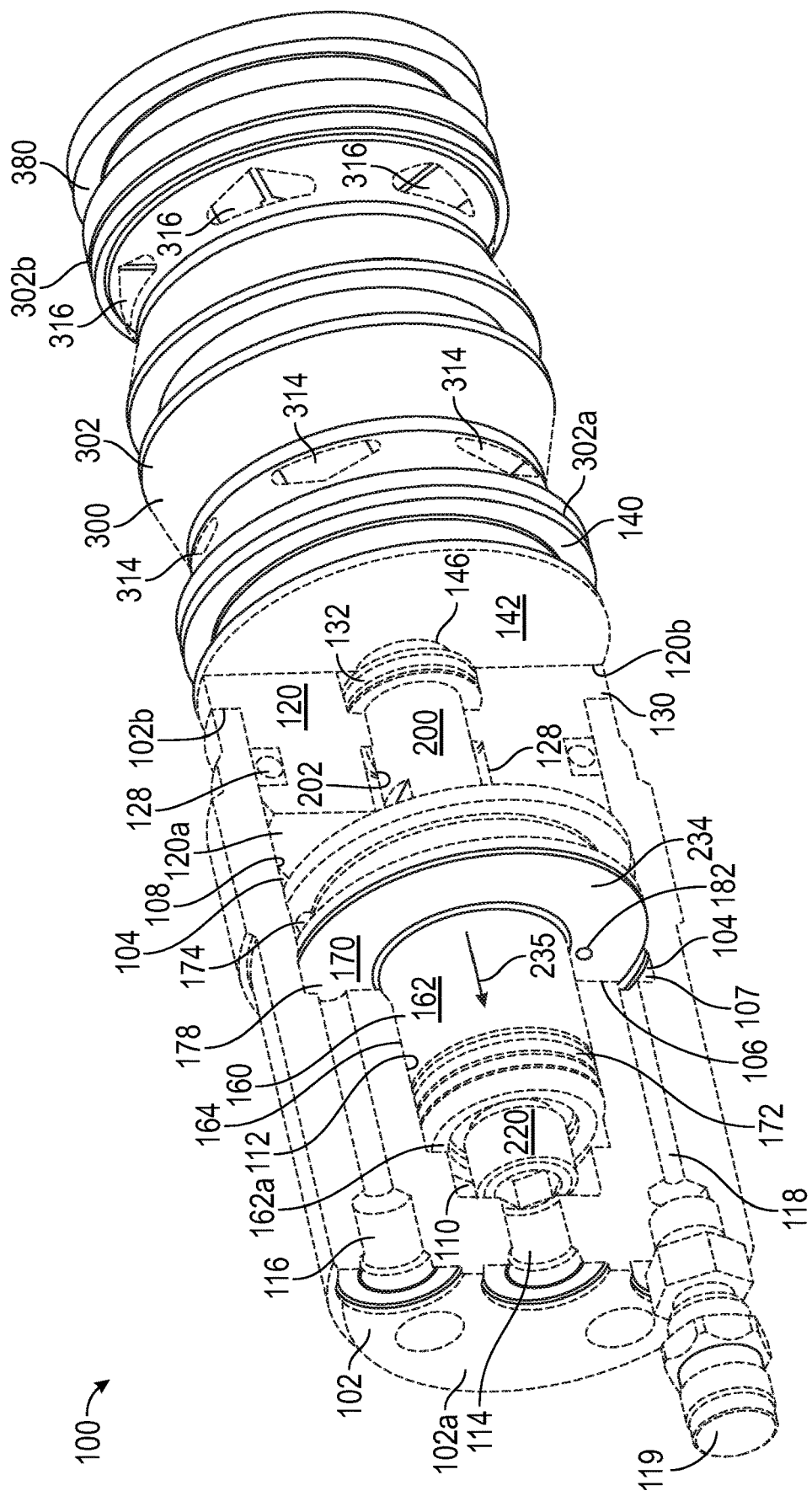
FIG. 5 is a second perspective, cross-sectional view of the sealable valve shown in FIG. 3.
Figure 6A:
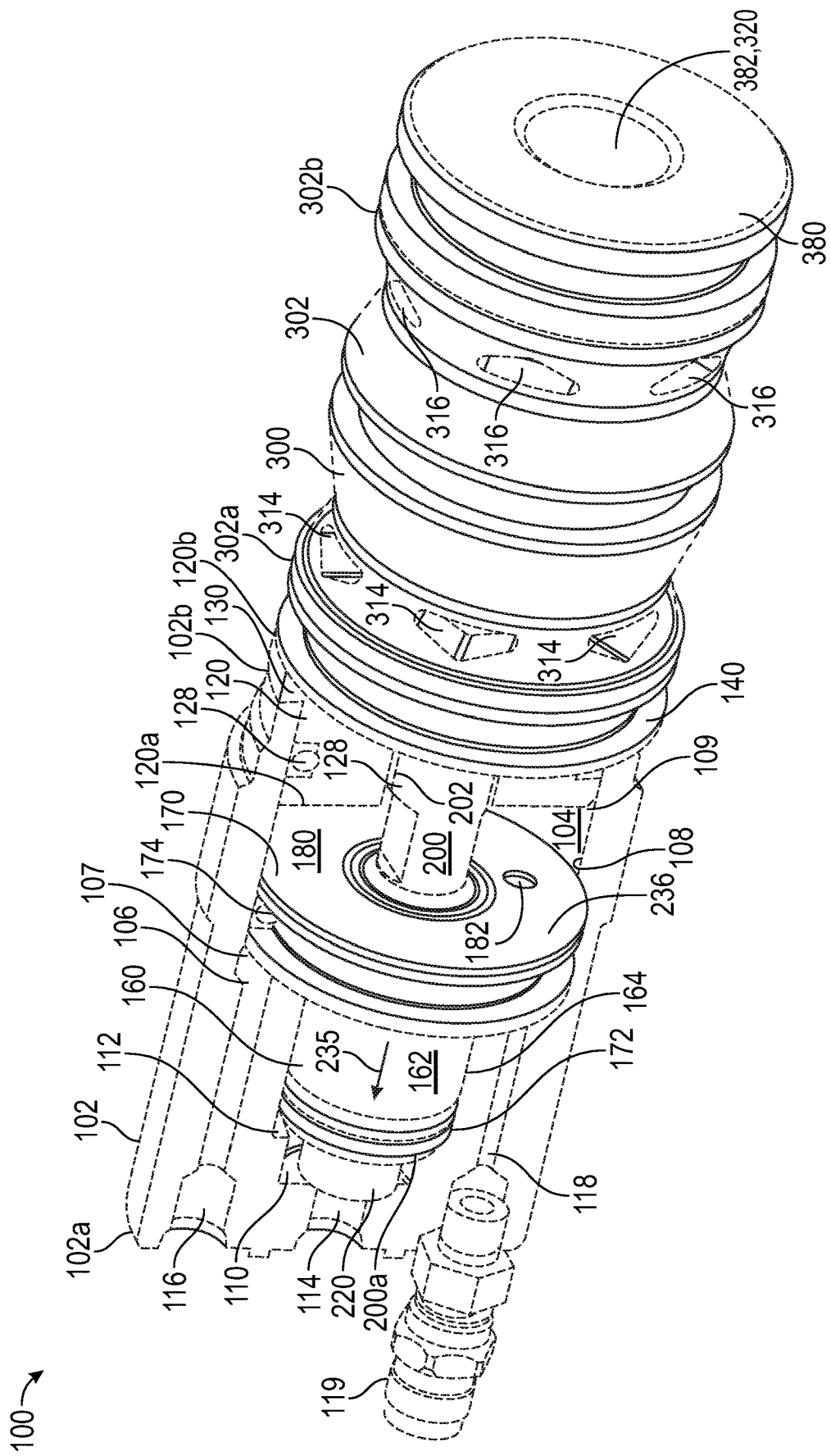
FIG. 6A is a third perspective, cross-sectional view of the sealable valve shown in FIG. 3.
Figure 6B:
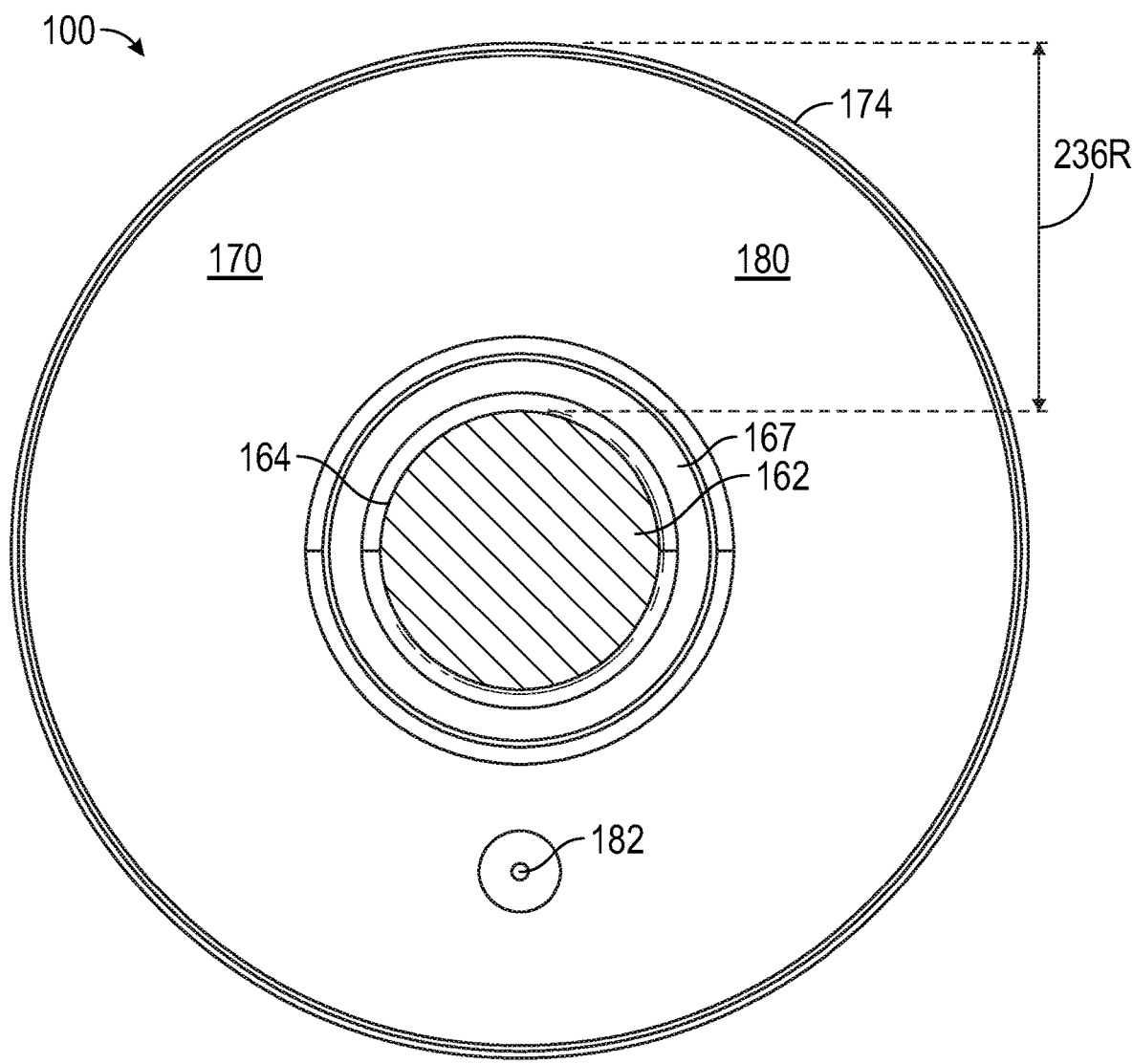
FIG. 6B is a bottom, cross-sectional view illustrating a third pressure area of the sealable valve shown in FIG. 3.
Figure 7:
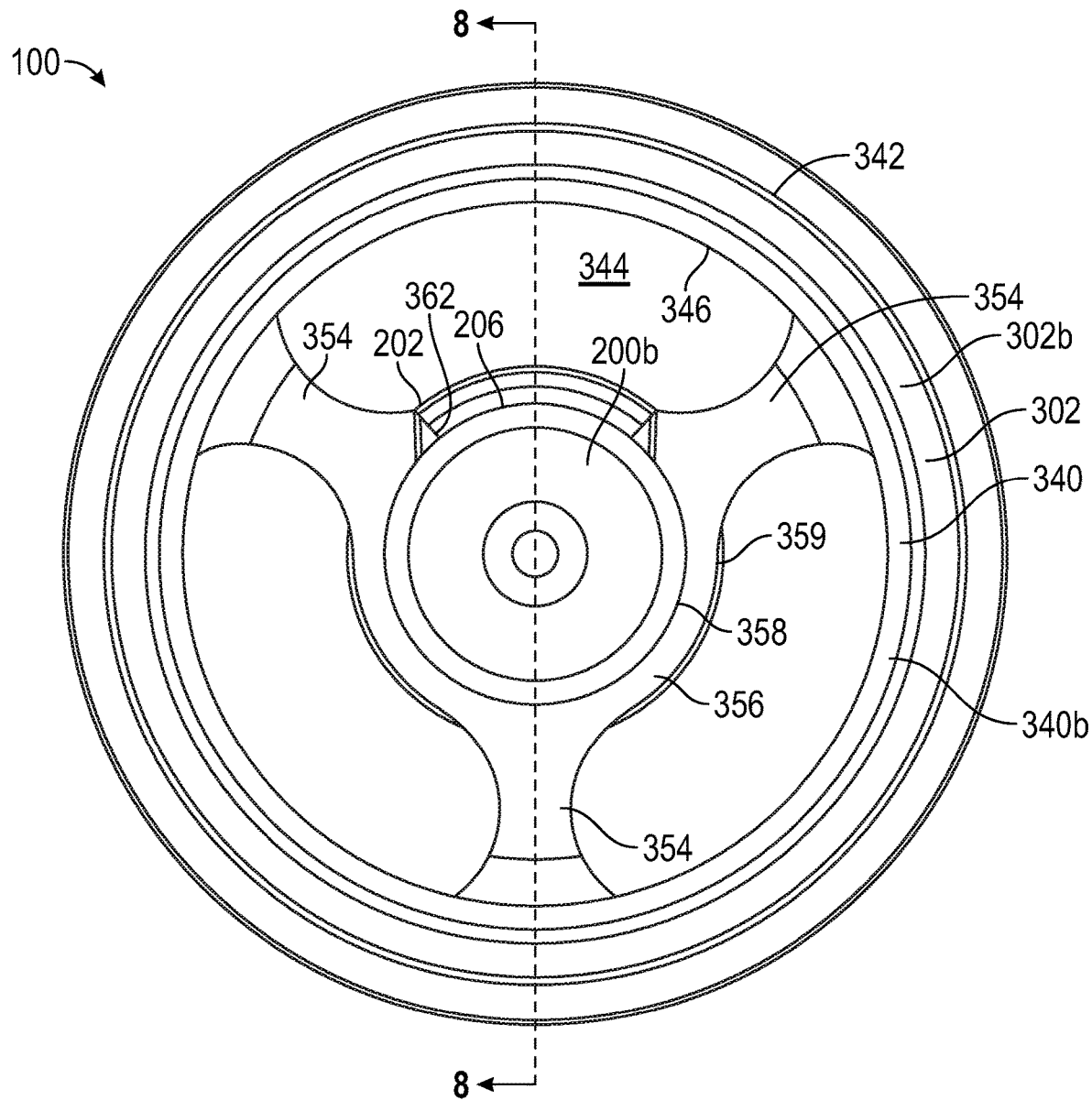
FIG. 7 is a top view of an embodiment of components of a cage assembly of the sealable valve shown in FIG. 3 in accordance with principles disclosed herein.
Figure 8:
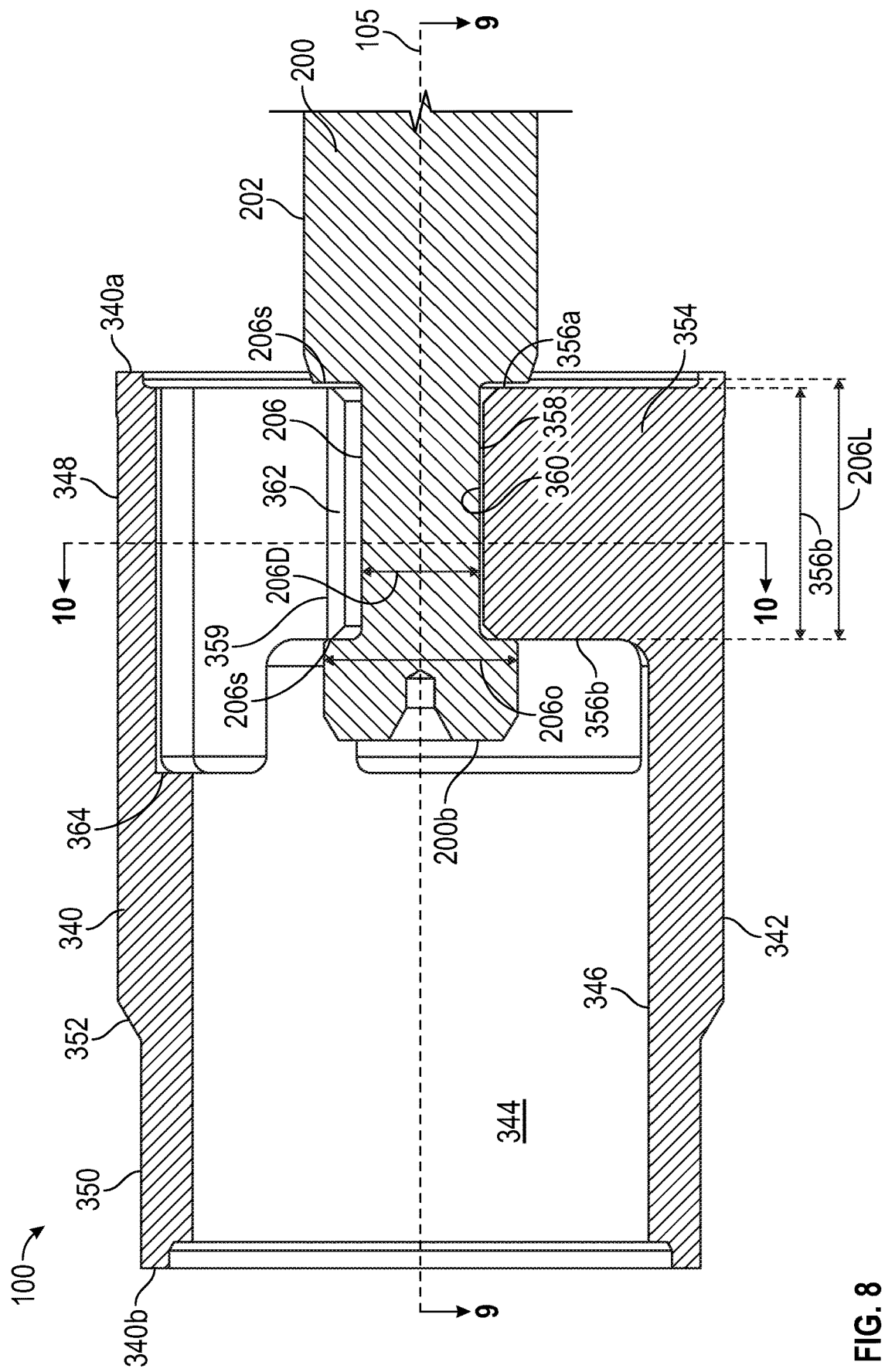
FIG. 8 is a cross-sectional view along line 8-8 of FIG. 7 of the components of the cage assembly shown in FIG. 7.
Figure 9:
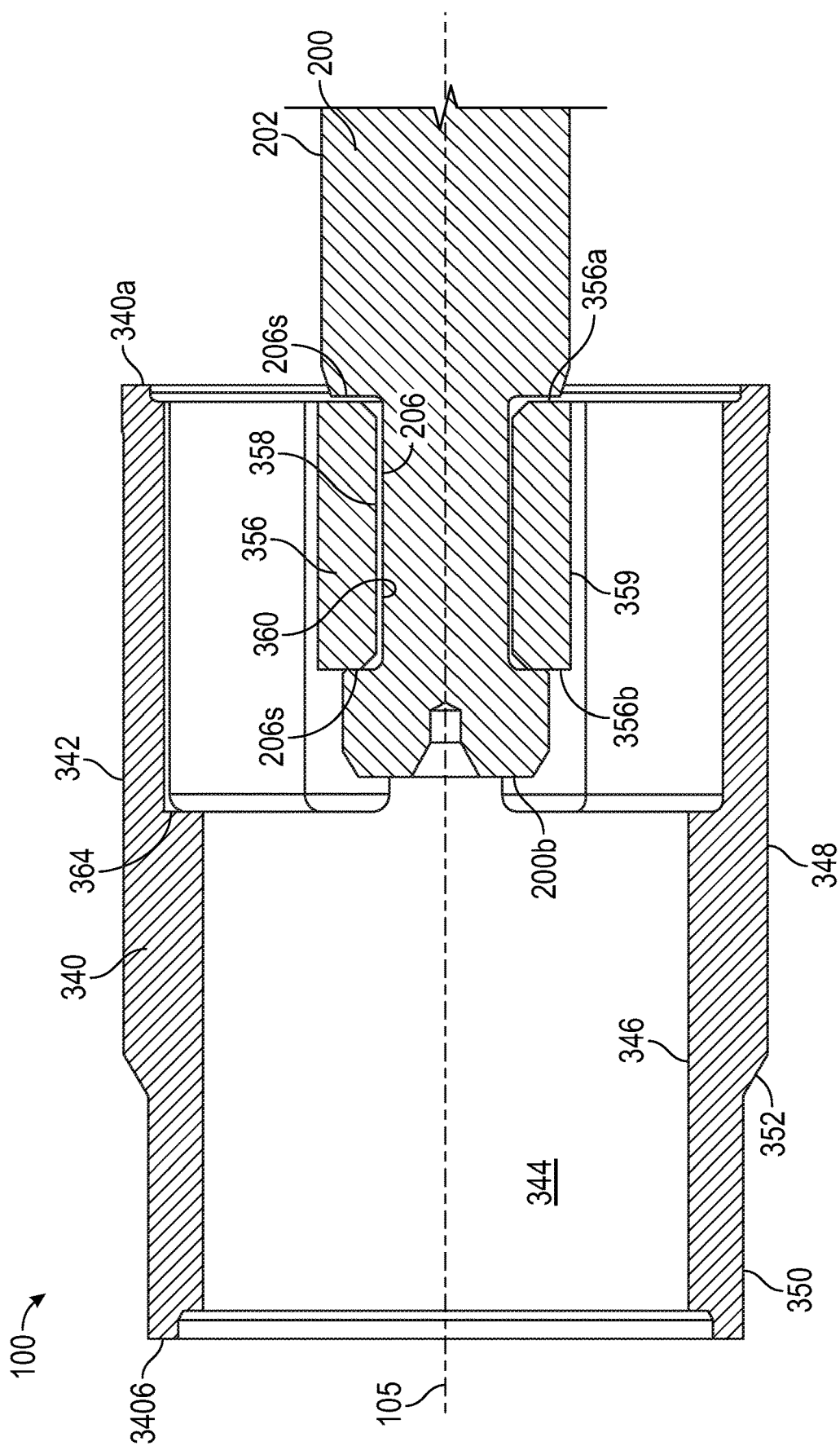
FIG. 9 is a cross-sectional view along line 9-9 of FIG. 8 of the components of the cage assembly shown in FIG. 7.
Figure 10:
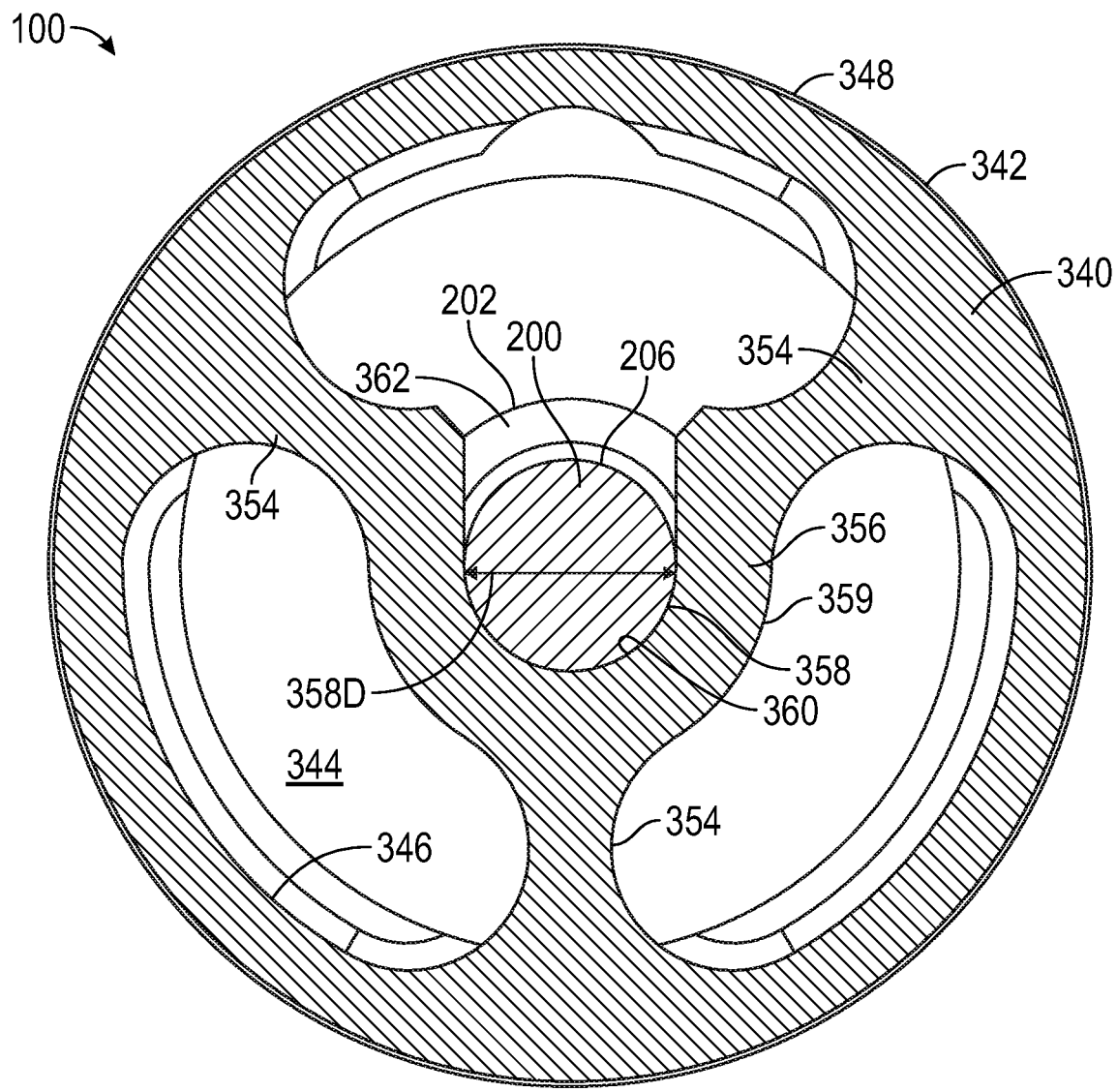
FIG. 10 is a cross-sectional view along line 10-10 of FIG. 8 of the components of the cage assembly shown in FIG. 7.

Moreover, fluid pressure within throughbore 344 of spool 340 acts against the lower end 200b of piston rod 200, thereby applying a pressure force against piston assembly 160 in the same direction as pressure force 235 shown in FIGS. 5 and 6. Thus, rapid changes in fluid pressure within throughbore 344 may produce rapid changes in the net pressure force (either in the direction of force 233 or force 235) applied to piston assembly 160 as valve 100 transitions between the closed and open positions. In turn, without the damping effect provided by port 182 of piston 162 and the close proximity between the inner surface 306 of cage 302 and the outer surface 342 of spool 340, the acceleration the displacement of piston assembly 160 and spool 340 coupled thereto is increased, thereby possibly resulting in a collision between spool 340 and either cage plate 380 or valve plate 140, thereby potentially damaging components of cage assembly 300 and piston assembly 160.

However, provided the flow restrictions provided by the close proximity between the inner surface 306 of cage 302 and the outer surface 342 of spool 340, the gradual decline of flow area percentage 390 and subsequent gradual increase in flow area percentage 392 once flow area percentage 390 has closed (as valve 100 is actuated from the open position to the closed position) prevents or mitigates the possibility of a rapid depressurization of throughbore 344 and reduces the possibility of a collision between spool 340 and valve plate 140. Similarly, without the flow restrictions provided by the close proximity between the inner surface 306 of cage 302 and the outer surface 342 of spool 340, a rapid pressure increase within throughbore 344, such as through a rapid increase or opening of flow area percentage 390 as valve 100 transitions from the closed position to the open position, could result in an increased pressure force 235 that causes the upper end 340a of spool 340 to collide violently against the upper surface 384 of cage plate 380, possibly damaging spool 340 or other components of valve 100. However, provided the flow restrictions provided by the close proximity between the inner surface 306 of cage 302 and the outer surface 342 of spool 340, the gradual reduction in flow area percentage 390, non-overlap of open flow area percentages 390 and 392, and subsequent gradual opening of flow area percentage 392, prevents a rapid pressure increase within throughbore 344 that may result in an impact between spool 340 and valve plate 140.

Further, without the damping effect provided by port 182 and the flow restrictions provided by the close proximity between the inner surface 306 of cage 302 and the outer surface 342 of spool 340, rapid changes in fluid flow within cage assembly 300 may result in "water hammer," where pressurized fluid violently impacts and possibly damages components of valve 100, such as spool 340. Water hammer may particularly result in response to rapid changes in flow area percentages 390 and 392 as spool 340 travels through throughbore 304 of cage 302, or an overlap in open or partially open flow area percentages 390 and 392 which allow for cross-flow directly between inlet ports 314 and outlet ports 316. However, the gradual change of flow area percentages 390 and 392 as spool 340 travels through throughbore 304, and the restriction of any overlap between concurrently open flow area percentages 390 and 392, provided by cage assembly 300 prevents or mitigates the possibility of water hammer occurring as valve 100 transitions between the closed and open positions and vice versa.

Figure 17:
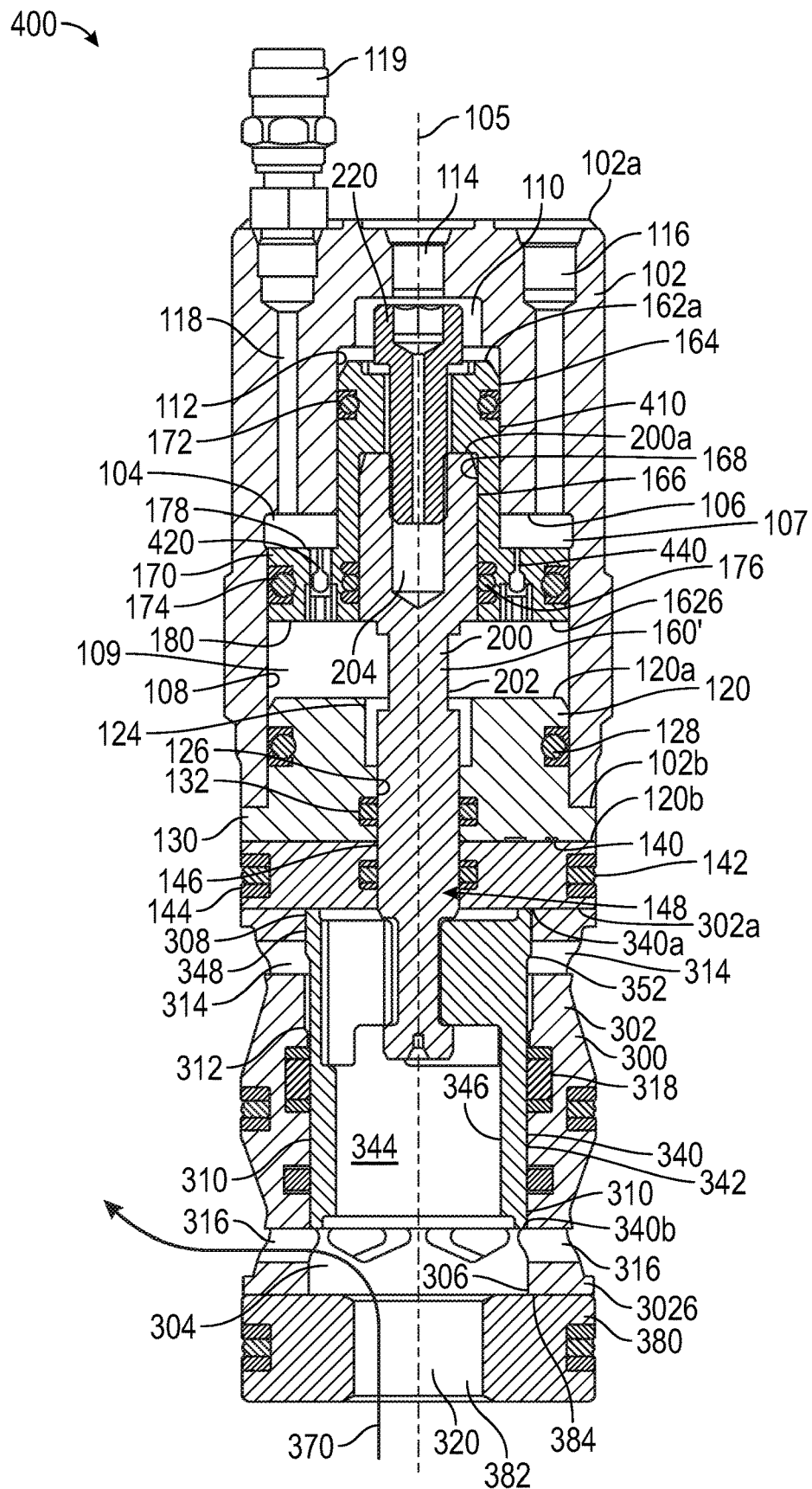
FIG. 17 is a side cross-sectional view of another embodiment of one of the sealable valves shown in FIG. 2 in accordance with principles disclosed herein.
Figure 18:
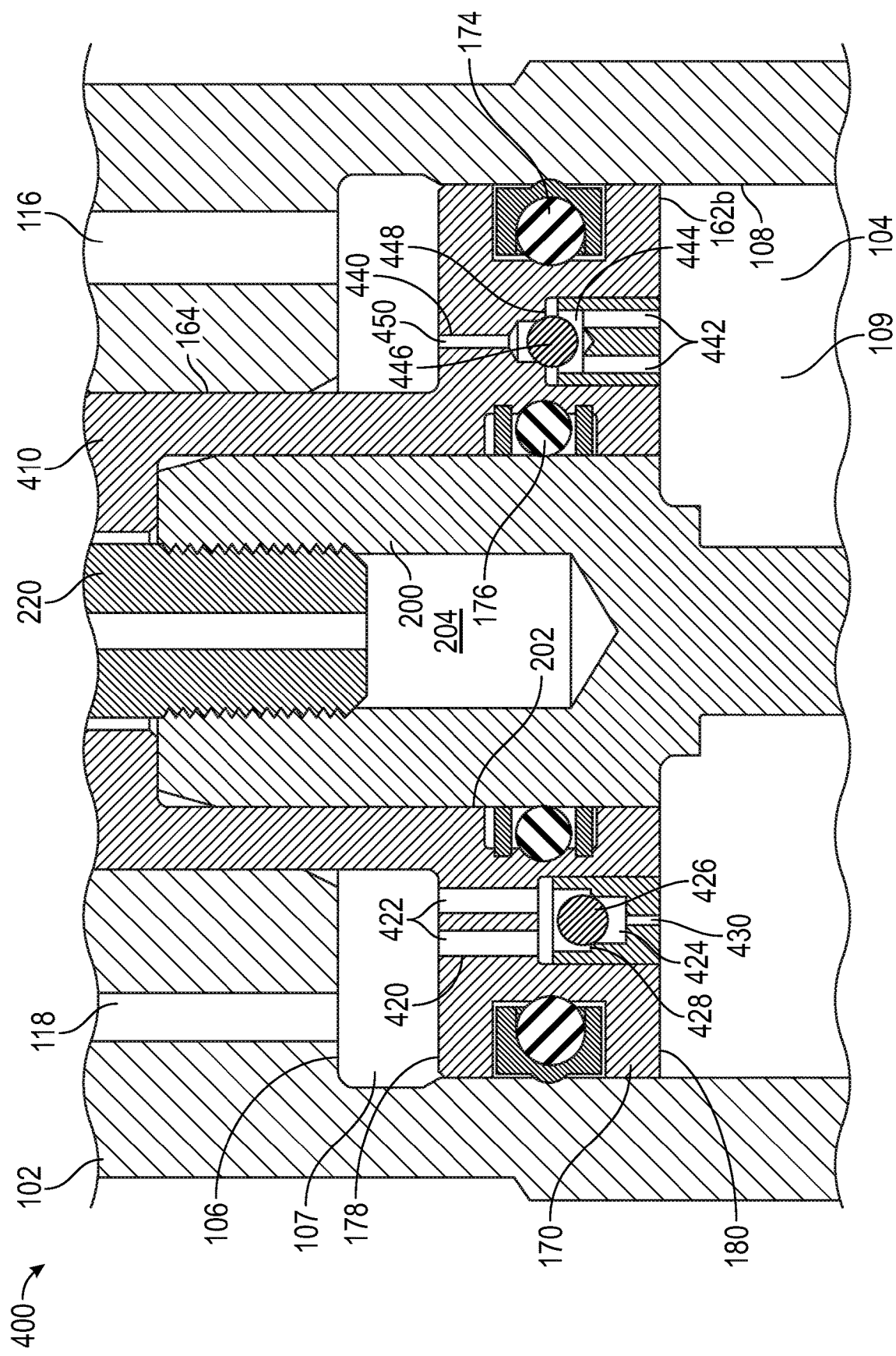
FIG. 18 is a zoomed-in view of an embodiment of a piston assembly of the sealable valve of FIG. 17.

Referring to FIGS. 17 and 18, another embodiment of a sealable valve 400 is shown for use with well system 10, as well as other well systems, including land based well systems. Valve 400 includes features in common with valve 100 shown in FIGS. 3-16 and described above, and shared features are labeled similarly. In the embodiment shown, the piston assembly 160' includes an annular piston 410 in lieu of piston 162 shown in FIGS. 3-15, where piston 410 of valve 400 includes features in common with piston 162 of valve 100. In this embodiment, instead of a single port 182, piston 410 includes a first port assembly 420 and a second port assembly 440, where assemblies 420 and 440 are each radially offset longitudinal axis 105 and extend axially between the upper surface 178 and lower surface 180 of the annular flange 170 of piston 410.

As shown particularly in FIG. 18, first port assembly 420 generally includes a pair of radially spaced ports 422, a check valve chamber 424, an obturating member or ball 426 disposed in chamber 424, an annular seat 428, and a check valve port 430. In this embodiment, ports 422 extend axially from upper surface 178 of flange 170 to chamber 424. Obturating member 426 is displaceable within chamber 424 and includes a seated position (shown in FIG. 18) where member 426 is seated upon or sealingly engages seat 428, and an unseated position (not shown) where obturating member 426 is displaced from seat 428. Check valve port 430 extends axially from chamber 424 to the lower surface 180 of flange 170. In this configuration, fluid communication is provided between ports 422 and check valve port 430 when obturating member 426 is in the unseated position. Conversely, fluid communication is restricted between ports 422 and check valve port 430 when obturating member 426 is disposed in the seated position shown in FIG. 18. In this manner, chamber 424, obturating member 426, and seat 428 form a check valve allowing for fluid communication in only a single direction through port assembly 420.

In this arrangement, port assembly 420 is configured to provide for fluid communication from lower chamber 109 to upper chamber 107 via ports 422 and 430 as valve 400 transitions from the closed position shown in FIG. 17 to the open position, and restrict or prevent fluid flow between chambers 107 and 109 through ports 422 and 430 when valve 400 transitions from the open position to the closed position. Particularly, when valve 400 is actuated from the closed position to the open position, fluid entering check valve port 430 from lower chamber 109 as piston 410 is displaced towards the upper end 120a of hub 120 forces obturating member 426 into the unseated position, providing for fluid flow therethrough. Conversely, when valve 400 is actuated from the open position to the closed position, fluid entering ports 422 from upper chamber 107 as piston 410 is displaced towards the upper surface 106 of bore 104 forces obturating member 426 into the seated position, restricting or blocking fluid flow therethrough.

In the embodiment shown, port assembly 440 generally includes a pair of radially spaced ports 442, a check valve chamber 444, an obturating member or ball 446 disposed in chamber 444, an annular seat 448, and a check valve port 450. In this embodiment, ports 442 extend axially from lower surface 180 of flange 170 to chamber 444. Obturating member 446 is displaceable within chamber 444 and includes a seated position (shown in FIG. 18) where member 446 is seated upon or sealingly engages seat 448, and an unseated position (not shown) where obturating member 446 is displaced from seat 448. Check valve port 450 extends axially from chamber 444 to the upper surface 178 of flange 170. Similar to port assembly 420, fluid communication is provided between ports 442 and check valve port 450 when obturating member 446 is in the unseated position. Conversely, fluid communication is restricted or blocked between ports 442 and check valve port 450 when obturating member 446 is disposed in the seated position. In this manner, chamber 444, obturating member 446, and seat 448 form a check valve allowing for fluid communication in only a single direction through port assembly 440.

In this arrangement, port assembly 440 is configured to provide for fluid communication between upper chamber 107 and lower chamber 109 via ports 442 and 450 as valve 400 transitions from the open position to the closed position shown in FIG. 17, and restrict fluid flow from lower chamber 109 to upper chamber 107 through ports 442 and 450 when valve 400 transitions from the closed position to the open position. Particularly, when valve 400 is actuated from the open position to the closed position, fluid entering check valve port 450 from upper chamber 107 as piston 410 is displaced towards the upper surface 106 of bore 104 forces obturating member 446 into the unseated position, providing for fluid flow therethrough. Conversely, when valve 400 is actuated from the closed position to the open position, fluid entering ports 442 from lower chamber 109 as piston 410 is displaced towards the upper end 120a of hub 120 forces obturating member 446 into the seated position, restricting or blocking fluid flow therethrough.

In the configuration described above, first and second port assemblies 420 and 440 provide bi-directional control of the rate of actuation of valve 400 between the closed and open positions. Specifically, the rate of actuation of valve 400 from the closed position shown in FIG. 17 to the open position (i.e., opening actuation rate) is modulated or controlled by first port assembly 420, while the rate of actuation of valve 400 from the open position to the closed position (i.e., closing actuation rate) is modulated or controlled by second port assembly 440. Therefore, the opening actuation rate of valve 400 and the closing actuation rate of valve 400 may be independently adjusted or controlled by adjusting the degree of flow restriction (i.e., the flow area) provided by port assemblies 420 and 440. For instance, by increasing or decreasing the flow area (i.e., the cross-sectional area) of port 430 of port assembly 420, the rate of actuation of valve 400 from the closed position to the open position may be increased or decreased, respectively, while maintaining the same rate of actuation of valve 400 from the open position to the closed position. Conversely, by increasing or decreasing the flow area of port 450, the rate of actuation of valve 400 from the open position to the closed position may be increased or decreased, respectively, independent of the rate of actuation of valve 400 from the closed position to the open position.

In this manner, valve 400 may be configured to actuate at a first rate from the closed position to the open position, and at a second rate from the open position to the closed position, where the first rate is different from the second rate. Moreover, configuring first port assembly 420 to provide a first flow restriction and second port assembly 440 to apply a second flow restriction, where the first flow restriction is different from the second flow restriction may be advantageous in particular applications. For instance, reducing the flow restriction provided by second port assembly 440 relative first port assembly 420 allows for valve 400 to achieve a desired opening actuation rate of valve 400 even if the pressure differential between first port 114 and second port 116 is reduced, such that a relatively smaller pressure force 235 is applied to piston assembly 160.

While embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve for a well system, comprising:
a valve housing comprising a first housing port, a second housing port, and a bore;
a piston received in the bore of the housing and having a longitudinal axis, the piston comprising a first end, a second end, and an annular flange comprising a first annular surface and a second annular surface both of the first annular surface and the second annular surface are in fluid communication with the second housing port, and wherein both the first annular surface and the second annular surface are fluidically sealed from the first housing port;
a piston seal disposed in an outer surface of the piston and in sealing engagement with an inner surface of the bore, the piston seal disposed in an axial position that is between the first annular surface and the second annular surface of the annular flange, wherein the surface area of the first annular surface extending perpendicular to a central axis of the piston is less than the surface area of the second annular surface extending perpendicular to the central axis of the piston; and
a cage assembly, comprising:
a cage comprising a bore, a first cage port, a second cage port, and a third cage port;
a spool disposed in the cage and coupled to the piston, the spool comprising a throughbore;
wherein a first chamber and a second chamber, separated from the first chamber by the annular flange, are formed in the valve housing, the first chamber and second chamber each being entirely external the piston and the first chamber extending from a first end located at an outlet of the second housing port to a second end located at the first annular surface, and wherein a flowpath is formed in the valve housing that is entirely external the piston and extends from the second housing port into the first chamber;
wherein a fluid pressurization of the first housing port applies a pressure force against the first end of the piston in a first direction;
wherein a fluid pressurization of the second housing port applies a pressure force against the first annular surface of the annular flange in the first direction, and a pressure force against the second annular surface of the annular flange in a second direction opposite the first direction;
wherein the fluid pressurization of the first housing port displaces the piston and spool in the first direction, and the fluid pressurization of the second housing port displaces the piston and spool in the second direction.

2. The valve of claim 1, further comprising:
a piston port extending through the annular flange of the piston;
wherein the piston port provides for fluid communication between the first chamber and the second chamber.

3. The valve of claim 2, wherein:
in response to displacement of the piston in the first direction, fluid is conveyed from the second chamber to the first chamber through the piston port; and
in response to displacement of the piston in the second direction, fluid is conveyed from the first chamber to the second chamber through the piston port.

4. The valve of claim 1, wherein:
the bore of the cage is defined by an inner surface comprising an expanded diameter section and a reduced diameter section;
the spool comprises an outer surface comprising an expanded diameter section and a reduced diameter section;
the diameter of the expanded diameter section of the spool is substantially equal to the diameter of the expanded diameter section of the cage; and the diameter of the reduced diameter section of the spool is substantially equal to the diameter of the reduced diameter section of the cage.

5. The valve of claim 4, further comprising a cage seal disposed between the inner surface of the cage and the outer surface of the spool, the cage seal configured to restrict fluid communication between the first cage port and the second cage port.

6. The valve of claim 4, wherein the spool and cage are configured to allow the spool to move within the cage between a first position, a second position, and a third position, wherein:
when the spool is disposed in the first position, fluid communication is provided between the second cage port and the third cage port, and fluid communication is restricted between the first cage port and the third cage port;
when the spool is disposed in the second position, fluid communication is provided between the first cage port and the third cage port, and fluid communication is restricted between the second cage port and the third cage port; and
when the spool is disposed in the third position, the spool is disposed between the first and second positions and fluid communication is restricted between the first cage port and the third cage port, and between the second cage port and the third cage port.

7. The valve of claim 6, wherein:
when the spool is disposed at positions between the first and third positions within the cage fluid communication is restricted between the first cage port and the third cage port; and
when the spool is disposed at positions between the second and third positions within the cage fluid communication is restricted between the second cage port and the third cage port.

8. The valve of claim 6, wherein:
when the spool is displaced from the first position to the third position, a flow area between the second cage port and the third cage port becomes gradually reduced; and
when the spool is displaced from the third position to the second position, a flow area between the first cage port and the third cage port becomes gradually increased.

9. The valve of claim 6, wherein:
when the spool is displaced from the third position to the first position, a flow area between the second cage port and the third cage port becomes gradually increased; and
when the spool is displaced from the second position to the third position, a flow area between the first cage port and the third cage port becomes gradually reduced.

10. The valve of claim 1, wherein both the first housing port and the second housing port are each entirely external the piston and extend into the valve housing from an external surface of the valve housing.

11. A valve system, comprising:
a pressurized fluid source;
the valve of claim 1, wherein both the first housing port and the second housing port of the valve are connected to the pressurized fluid source; and
a controller configured to selectably apply fluid pressure from the pressurized fluid source to the first housing port and the second housing port of the valve.

12. A valve for a well system, comprising:
a valve housing comprising a first housing port, a second housing port, and a bore;
a piston received in the bore of the housing and having a longitudinal axis, the piston comprising a first end, a second end, and an annular flange comprising a first annular surface and a second annular surface, wherein both the first annular surface and the second annular surface are fluidically sealed from the first housing port;
a piston seal disposed in an outer surface of the piston and in sealing engagement with an inner surface of the bore, the piston seal disposed in an axial position that is between the first annular surface and the second annular surface of the annular flange; and
a cage assembly, comprising:
a cage comprising a bore, a first cage port, a second cage port, and a third cage port;
a spool disposed in the cage and coupled to the piston, the spool comprising a throughbore;
wherein a first chamber and a second chamber, separated from the first chamber by the annular flange, are formed in the valve housing, the first chamber and second chamber each being entirely external the piston and the first chamber extending from a first end located at an outlet of the second housing port to a second end located at the first annular surface, and wherein a flowpath is formed in the valve housing that is entirely external the piston and extends from the second housing port into the first chamber;
wherein a fluid pressurization of the first housing port applies a pressure force against the first end of the piston in a first direction;
wherein a fluid pressurization of the second housing port applies a pressure force against the first annular surface of the annular flange in the first direction, and a pressure force against the second annular surface of the annular flange in a second direction opposite the first direction;
wherein the fluid pressurization of the first housing port displaces the piston and spool in the first direction, and the fluid pressurization of the second housing port displaces the piston and spool in the second direction.

13. The valve of claim 12, wherein the surface area of the first annular surface of the annular flange is less than the second annular surface of the annular flange.

14. The valve of claim 12, further comprising:
a piston port extending through the annular flange of the piston;
wherein the piston port provides for fluid communication between the first chamber and the second chamber.

15. The valve of claim 14, wherein:
in response to displacement of the piston in the first direction, fluid is conveyed from the second chamber to the first chamber through the piston port; and
in response to displacement of the piston in the second direction, fluid is conveyed from the first chamber to the second chamber through the piston port.

16. The valve of claim 12, wherein:
the bore of the cage is defined by an inner surface comprising an expanded diameter section and a reduced diameter section;
the spool comprises an outer surface comprising an expanded diameter section and a reduced diameter section;

the diameter of the expanded diameter section of the spool is substantially equal to the diameter of the expanded diameter section of the cage; and the diameter of the reduced diameter section of the spool is substantially equal to the diameter of the reduced diameter section of the cage.

17. The valve of claim 16, further comprising a cage seal disposed between the inner surface of the cage and the outer surface of the spool, the cage seal configured to restrict fluid communication between the first cage port and the second cage port.

18. The valve of claim 16, wherein the spool and cage are configured to allow the spool to move within the cage between a first position, a second position, and a third position, wherein:
   when the spool is disposed in the first position, fluid communication is provided between the second cage port and the third cage port, and fluid communication is restricted between the first cage port and the third cage port;
   when the spool is disposed in the second position, fluid communication is provided between the first cage port and the third cage port, and fluid communication is restricted between the second cage port and the third cage port; and
   when the spool is disposed in the third position, the spool is disposed between the first and second positions and fluid communication is restricted between the first cage port and the third cage port, and between the second cage port and the third cage port.

19. The valve of claim 18, wherein:
when the spool is disposed at positions between the first and third positions within the cage fluid communication is restricted between the first cage port and the third cage port; and
when the spool is disposed at positions between the second and third positions within the cage fluid communication is restricted between the second cage port and the third cage port.

20. The valve of claim 18, wherein:
when the spool is displaced from the first position to the third position, a flow area between the second cage port and the third cage port becomes gradually reduced; and
when the spool is displaced from the third position to the second position, a flow area between the first cage port and the third cage port becomes gradually increased.

21. The valve of claim 18, wherein:
when the spool is displaced from the third position to the first position, a flow area between the second cage port and the third cage port becomes gradually increased; and
when the spool is displaced from the second position to the third position, a flow area between the first cage port and the third cage port becomes gradually reduced.

* * * * *